(12) United States Patent
Engh-halstvedt et al.

(10) Patent No.: US 9,805,447 B2
(45) Date of Patent: Oct. 31, 2017

(54) METHODS OF AND APPARATUS FOR PROCESSING COMPUTER GRAPHICS

(71) Applicant: ARM Limited, Cambridge (GB)

(72) Inventors: Andreas Engh-halstvedt, Trondheim (NO); Jorn Nystad, Trondheim (NO); Frode Heggelund, Trondheim (NO); Ronny Pedersen, Trondheim (NO)

(73) Assignee: Arm Limited, Cambridge (GB)

( * ) Notice: Subject to any disclaimer, the term of this patent is extended or adjusted under 35 U.S.C. 154(b) by 577 days.

(21) Appl. No.: 13/690,142

(22) Filed: Nov. 30, 2012

(65) Prior Publication Data

US 2013/0141445 A1    Jun. 6, 2013

(30) Foreign Application Priority Data

Dec. 5, 2011  (GB) .................................. 1120905.3

(51) Int. Cl.
*G06T 5/00*     (2006.01)
*G06T 15/50*    (2011.01)
*G06T 11/40*    (2006.01)

(52) U.S. Cl.
CPC .............. *G06T 5/002* (2013.01); *G06T 11/40* (2013.01); *G06T 15/503* (2013.01); *G06T 2200/28* (2013.01)

(58) Field of Classification Search
None
See application file for complete search history.

(56) References Cited

U.S. PATENT DOCUMENTS 5,388,206 A * 2/1995 Poulton et al. ............... 345/505
6,697,063 B1 * 2/2004 Zhu ............................... 345/421

(Continued)

FOREIGN PATENT DOCUMENTS

CN   101065784 A   10/2007
CN   101916543 A   12/2010
(Continued)

OTHER PUBLICATIONS

UK Search Report dated Apr. 3, 2012, UK Patent Application No. GB1120905.3.
Office Action mailed Aug. 8, 2016, in Japanese Patent Application No. 2012-265044.
Office Action dated Jul. 29, 2016 in Chinese Patent Application No. 201210514945.6, with English translation, 32 pages.
(Continued)

*Primary Examiner* — Saptarshi Mazumder
(74) *Attorney, Agent, or Firm* — Vierra Magen Marcus LLP

(57) ABSTRACT

When carrying out a second, higher level of anti-aliasing such as 8×MSAA, in a graphics processing pipeline 1 configured to "natively" support a first level of anti-aliasing, such as 4×MSAA, the rasterization stage 3, early Z (depth) and stencil test stage 4, late Z (depth) and stencil test stage 7, blending stage 9, and downsampling and writeback (multisample resolve) stage 11 of the graphics processing pipeline 1 process each graphics fragment or pixel that they receive for processing in plural processing passes, each such processing pass processing a sub-set of the sampling points that the fragment represents, but the fragment shader 6 is configured to process each graphics fragment in a processing pass that processes all the sampling points that the fragment represents in parallel, so as to ensure compliance with the desired higher level of multisampled anti-aliasing.

20 Claims, 8 Drawing Sheets

(56) References Cited

U.S. PATENT DOCUMENTS

| | | | |
|---|---|---|---|
| 6,801,203 B1* | 10/2004 | Hussain | 345/506 |
| 7,064,771 B1* | 6/2006 | Jouppi et al. | 345/614 |
| 7,447,873 B1* | 11/2008 | Nordquist | 712/22 |
| 7,634,637 B1 | 12/2009 | Lindholm | |
| 7,920,139 B2 | 4/2011 | Nystad et al. | |
| 2007/0018990 A1 | 1/2007 | Shreiner | |
| 2010/0008572 A1 | 1/2010 | Koduri et al. | |
| 2010/0110102 A1* | 5/2010 | Nystad et al. | 345/611 |
| 2013/0069943 A1* | 3/2013 | Kallio et al. | 345/420 |

FOREIGN PATENT DOCUMENTS

| | | |
|---|---|---|
| JP | H08-503563 A | 4/1996 |
| JP | 2010-20764 A | 1/2010 |
| JP | 2010-102713 A | 5/2010 |
| JP | 2011-1239894 A | 6/2011 |
| WO | WO 2006/126093 | 11/2006 |

OTHER PUBLICATIONS

English Abstract of CN101916543A published Dec. 15, 2010.
English Abstract of CN101065784A published Oct. 31, 2007.
Examination Report and Notification of Intention to Grant under Sec. 18(4) mailed Feb. 1, 2017, in GB Patent Application No. GB1120905.3.
Office Action dated Jan. 13, 2017, in Chinese Patent Application No. 201210514945.6.
Office Action dated Jun. 12, 2017, in Chinese Patent Application No. 201210514945.6.

* cited by examiner

Real geometry           Rendered geometry

Supersample real geometry           Rendered geometry

METHODS OF AND APPARATUS FOR PROCESSING COMPUTER GRAPHICS

BACKGROUND

The technology described herein relates to the processing of computer graphics, and in particular to a method of and an apparatus for carrying out anti-aliasing when processing computer graphics.

As is known in the art, graphics processing is normally carried out by first dividing the output to be generated, such as a frame to be displayed, into a number of similar basic components (so-called "primitives") to allow the graphics processing operations to be more easily carried out. These "primitives" are usually in the form of simple polygons, such as triangles.

The graphics primitives are usually generated by the applications program interface for the graphics processing system, using the graphics drawing instructions (requests) received from the application (e.g. game) that requires the graphics output.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates) in order to generate the desired output of the graphics processing system.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output, e.g. scene to be displayed). This is typically done using the positions of the vertices of a primitive.

The rendering process then derives the data, such as red, green and blue (RGB) colour values and an "Alpha" (transparency) value, necessary to represent the primitive at the sample points (i.e. "shades" each sample point). This can involve, as is known in the art, applying textures, blending sample point data values, etc.

(In graphics literature, the term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

(A "fragment" is therefore effectively (has associated with it) a set of primitive data as interpolated to a given output space sample point or points of a primitive. It may also include per-primitive and other state data that is required to shade the primitive at the sample point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.)

(It is also the case that as multiple fragments, e.g. from different overlapping primitives, at a given location may affect each other (e.g. due to transparency and/or blending), the final pixel output may depend upon plural or all fragments at that pixel location.)

(Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.)

One problem that is encountered when processing graphics for display (when displaying computer generated images) is that the displayed image is quantised into the discrete pixel locations of the display, e.g. monitor or printer, being used. This limits the resolution of the image that is displayed and can produce unwanted visual artifacts, for example, where the resolution of the output display device is not high enough to display smooth lines. These effects are commonly referred to as "aliasing".

FIG. 1 illustrates such aliasing effects. The lefthand side of FIG. 1 shows the image to be drawn, and the righthand side shows the actual image that is displayed. As can be seen, the desired smooth curve of the white object in fact has a jagged appearance on the display. This is aliasing. (In FIG. 1, each square represents a pixel of the display, and the crosses represent the points at each (x, y) pixel location for which the colour value for that pixel location is determined (sampled). For example, the pixel A in FIG. 1 is drawn as all white, because the colour sampling point for that pixel location falls within the white object. It should be noted that in FIG. 1 only sample crosses on the pixels of interest are shown, although in practice all pixels will be sampled.)

All aliasing artifacts that could be visible to the naked eye could be removed by using a sufficiently high resolution display. However, the resolution of electronic displays and printers is typically limited, and so many graphics processing systems use other techniques to try to remove or reduce the effects of aliasing. Such techniques are typically referred to as anti-aliasing techniques.

One known anti-aliasing technique is referred to as super-sampling or oversampling.

In such an arrangement, there are plural sampling points (positions) per pixel of the final display, and a separate colour sample is taken for each (covered) individual sampling point (e.g. by rendering each sampling point as a separate fragment). The effect of this is that a different colour sample is taken for each sampling point of a display pixel that is covered by a primitive during the rendering process.

This means that plural colour samples are taken for each pixel of the display (one for each sampling point for the pixel, since a separate colour value is rendered for each sampling point). These plural colour samples are then combined into a single colour for the pixel when the pixel is displayed. This has the effect of smoothing or averaging the colour values from the original image at the pixel location in question.

FIG. 2 illustrates the supersampling process. In the example shown in FIG. 2, four sample points are determined for each pixel in the display and separate colour samples are taken for each sample point during the rendering process. (Each such sample can accordingly effectively be viewed as a "sub-pixel", with each pixel in the display being made up of four such sub-pixels.) The four colour value samples (sub-pixels) for a given pixel are then combined (downfiltered) such that the final colour that is used for the pixel in the display is an appropriate average (blend) of the colours of the four colour samples taken for the pixel.

This has the effect of smoothing the image that is displayed, and, e.g., reduces the prominence of aliasing artifacts by surrounding them with intermediate shades of colour. This can be seen in FIG. 2, where the pixel A now has two "white" samples and two "black" samples and so is set to 50% "white" in the displayed image. In this way, the pixels around the edges of the white object are blurred to produce a smoother edge, based on, e.g., how many samples are found to fall on each side of the edge.

Supersampling in effect processes the screen image at a much higher resolution than will actually be used for the display, and then scales and filters (down samples) the processed image to the final resolution before it is displayed. This has the effect of providing an improved image with reduced aliasing artifacts, but requires greater processing power and/or time, since the graphics processing system must in effect process as many fragments as there are samples (such that, e.g., for 4× supersampling (i.e. where 4 samples are taken for each display pixel), the processing requirements will be four times greater than if there was no supersampling).

Other anti-aliasing techniques have therefore been proposed that, while still providing some improvement in image quality, have less processing requirements than full supersampling.

One common such technique is referred to as "multisampling".

In the case of multisampling, multiple sampling points are again tested for each display pixel to determine whether a given primitive covers the sampling points or not when the image is rasterised into fragments (at the rasterisation stage). Thus the sampling point coverage of a primitive in a multisampling system is determined in a similar fashion to a "supersampling" system (and so the positions of the outer geometric edges of the primitives are still effectively "supersampled" (oversampled) in a multisampling system).

However, in the rendering process of a multisampling system, all the sampling points for a given display pixel that are covered by the primitive in question are allocated the same single, common set of colour value data (rather than each having their own separate set of data as would be the case for supersampling).

Thus, in multisampling, plural samples are again taken for each pixel that will make up the final display, but rather than determining a separate colour value for each sample when rendering the "pixel" (as would be the case for a full supersampling system), a single colour value is determined and applied to all the samples for a display pixel that are found to belong to the same object in the final image. In other words multisampling calculates a single colour value for a given display pixel for a given object in the scene, which colour value is applied to (reused for) all samples (subpixels) of the display pixel that are covered by that object (in contrast to supersampling where a separate colour value is determined for each sample).

Because only a single colour value is used for multiple samples for a given display pixel, multisampling is less processing intensive than supersampling and therefore can allow faster processing and performance than supersampling. However, there is a reduction in the quality of the displayed image as compared to supersampling, since although objects' edges are still sampled at a higher resolution, colours are not.

Notwithstanding this, many graphics processing systems use a multisampling anti-aliasing technique, as multisampling can in general provide adequate (and improved as compared to when there is no multisampling or supersampling at all) anti-aliasing in a rendered image, but without the significant extra processing and computational burden that full supersampling entails.

Many graphics processing systems are configured to be able to support a given level of multisampling anti-aliasing (MSAA) "natively" (i.e. are optimised for performing a given level of MSAA). For example, a tile-based graphics processor can be configured to support 4×MSAA at full speed by configuring the rasteriser to be able to test four sample points per (output) pixel per clock cycle, the blenders to be able to blend four samples per clock cycle, the depth (stencil) test units to be able to do depth/stencil checking for four samples per clock cycle, sizing the tile buffers for four samples per output pixel, configuring the tile writeback to be able to average four samples per pixel written back to main memory, and configuring any calculation units to be able to select the correct sample point for centroid mapping, etc., on the basis that 4×MSAA will be being used. Such a configuration can then allow the graphics processor to support 4×MSAA with little or no performance penalty.

However, it is now becoming more common for graphics APIs to require higher levels of anti-aliasing. For example, 8×MSAA is a required feature for Direct3D 11 compliance. One way to address this would be to configure a graphics processor to "natively" support the higher level of anti-aliasing, e.g. to support doing eight rather than four of everything per cycle. However, this would be relatively expensive, e.g. in hardware terms.

It would also be possible to approximate 8×MSAA by using 4×MSAA plus 2× supersampling (2×SSAA). However, this would only be an approximation to "true" 8×MSAA. For example, if using centroid mapping (where varyings are evaluated at the approximate centre of the covered sampling points associated with a fragment, instead of at the centre of the (output) pixel (or the centre of all the sampling points, whether covered or uncovered), then using 4×MSAA plus 2×SSAA would evaluate varyings at different positions to "true" 8×MSAA, potentially producing totally different results. Since Direct3D 11 requires an exact and predefined set of sample points for 8×MSAA, such as approximation would not be compliant with the Direct3D 11 standard.

The Applicants believe therefore that there remains scope for improved techniques for supporting higher levels of anti-aliasing in graphics processing systems.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
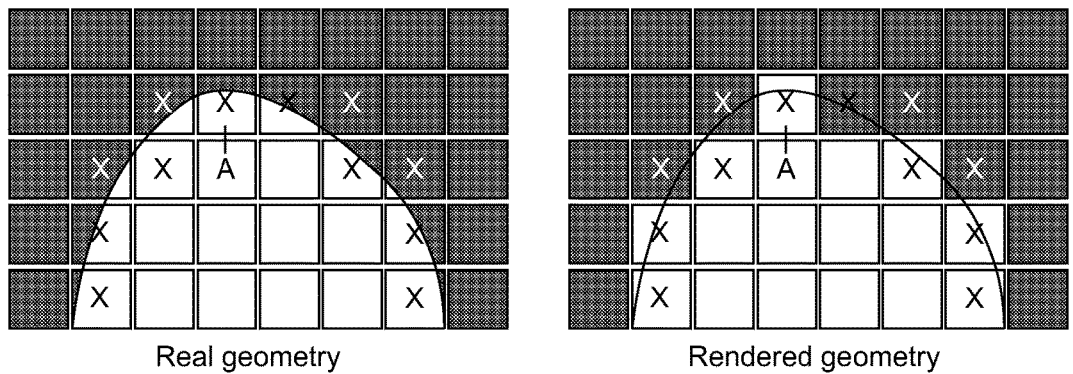
FIG. 1 shows schematically the effect of aliasing.
Figure 2:
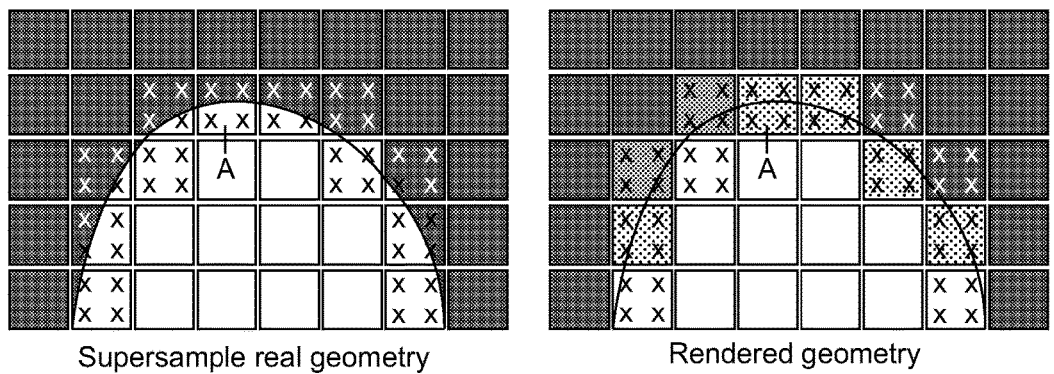
FIG. 2 shows schematically the supersampling anti-aliasing technique.

A first embodiment of the technology described herein comprises a method of carrying out a higher level of multisampled anti-aliasing in a graphics processing pipeline having a plurality of processing stages, at least some of which that are configured to natively support a lower level of multisampled anti-aliasing, the method comprising:

when performing the higher level of multisampled anti-aliasing:

the rasteriser of the graphics processing pipeline generating graphics fragments each representing a set of sampling points for the higher level of anti-aliasing, and passing those fragments to later stages of the graphics processing pipeline for processing;

one or more of the later processing stages of the graphics processing pipeline processing each graphics fragment that they receive for processing in a processing pass that processes all the sampling points that the fragment represents in parallel; and one or more other later processing stages of the graphics processing pipeline processing each graphics fragment that they receive for processing in one or more processing passes, each such processing pass processing a sub-set of the sampling points of the set of sampling points that the fragment represents.

A second embodiment of the technology described herein comprises a graphics processing pipeline comprising:

a rasteriser that generates graphics fragments each representing a set of sampling points for a given level of anti-aliasing, and passes those fragments to later stages of the graphics processing pipeline for processing;

one or more processing stages after the rasteriser that process each graphics fragment that they receive for processing in a processing pass that processes all the sampling points that the fragment represents in parallel; and one or more other processing stages after the rasteriser that are configured to natively support a level of multi-sampled anti-aliasing that is lower than the given level of anti-aliasing and that are configured to process each graphics fragment representing a set of sampling points for the given level of anti-aliasing that they receive for processing in one or more processing passes, each such processing pass processing a sub-set of the sampling points of the set of sampling points that the fragment represents.

A third embodiment of the technology described herein comprises a graphics processing pipeline comprising:

a rasteriser that generates graphics fragments each representing a set of sampling points to be processed, and that passes those fragments to later stages of the graphics processing pipeline for processing;

one or more processing stages after the rasteriser that when performing a first level of multisampled anti-aliasing process each graphics fragment that they receive for processing in a processing pass that processes all the sampling points that the fragment represents in parallel, and that when performing a higher level of anti-aliasing process each graphics fragment that they receive for processing in a processing pass that processes all the sampling points that the fragment represents in parallel; and one or more other processing stages after the rasteriser that when performing the first level of multisampled anti-aliasing process each graphics fragment that they receive for processing in a processing pass that processes all the sampling points that the fragment represents in parallel, but that when performing the higher level of anti-aliasing process each graphics fragment that they receive for processing in one or more processing passes, each such processing pass processing a sub-set of the sampling points of the set of sampling points that the fragment represents.

In the technology described herein, a graphics processing pipeline having one or more processing stages configured to support a given level of multi-sampled anti-aliasing is used to carry out a higher level of multi-sampled anti-aliasing. This is done by running some stages of the processing pipeline (potentially) multiple times, each time processing a given part of a fragment that represents a larger set of sampling points. (For example, if carrying out 8×MSAA in a pipeline configured to perform 4×MSAA, each 8× fragment could (and in an embodiment would) be processed as two parts, with each part processing 4 sampling points of the 8× fragment). However, in other parts of the processing pipeline, the "larger" fragment is processed as a whole in a single pass.

This provides, as will be discussed further below, a mechanism for performing higher level multi-sampled anti-aliasing without the need, e.g., to provide full "native" support for that higher level processing in all stages of the graphics pipeline, but which can still remain compliant with "true" higher level multi-sampled anti-aliasing processes. In particular, the Applicants have recognised that it can still be acceptable (and compliant) in some graphics processing stages when performing higher level multi-sampled anti-aliasing to perform the higher level multi-sampled anti-aliasing in plural passes, each processing a smaller part of the set of sampling points, and that, by doing that, the need to provide full higher level anti-aliasing support in those processing stages can be avoided. This can then allow higher level multi-sampled anti-aliasing to be carried out at a much lower hardware cost as compared, e.g., to providing full higher level anti-aliasing support in all stages of the graphics processing pipeline.

The Applicants have further recognised that there may be some graphics processing stages where the higher level anti-aliasing set of sampling points must be processed as a whole, in parallel, in a single pass, in order to be compliant with "true" higher level anti-aliasing. Accordingly, the technology described herein still does this for one or more of the graphics processing stages, but by limiting the number of stages that this is done for, the cost associated with this can be reduced and/or minimised.

The technology described herein thus provides a way of supporting higher levels of multi-sampling anti-aliasing in graphics processors that "natively" support a lower level of anti-aliasing (that are optimised for a lower level of anti-aliasing), without significant additional hardware cost. Furthermore, while the technology described herein may not be able to provide the same performance for the higher order multisampled anti-aliasing as would be the case if the graphics processor were configured natively to support the higher level of multisampling anti-aliasing, the Applicants have recognised that this is acceptable, as the higher level of multi-sampled anti-aliasing may not be commonly used, and when it is used, it may not be necessary to run it at full, "native" (optimised), speed. Thus, the Applicants believe that the cost benefits provided by the technology described herein can outweigh any potential performance disadvantage as compared to a system that can natively support the higher level of multisampled anti-aliasing. Provided performance is not critical, the technology described herein, in its embodiments at least, can allow a graphics processor to support a higher level of multisampled anti-aliasing than that for which it is primarily configured with little or virtually no area overhead.

The Applicants accordingly believe that the technology described herein can allow higher rates of anti-aliasing to be achieved, but without needing a significant increase in the size and power of the graphics processor and with an acceptable, if any, performance drop.

The graphics processing pipeline may contain any suitable and desired processing stages that a graphics processing pipeline may contain. In an embodiment, it includes, in an embodiment in this order, one or more of, and in an embodiment all of: a rasteriser; an early depth (or an early depth and stencil) tester; a fragment shader; a varyings position evaluation (interpolator) associated with the fragment shader; a late depth (or depth and stencil) tester; a blender; one or more tile buffers (in the case of tile-based rendering pipeline); and a tile writeback unit (again in the case of a tile-based rendering pipeline).

The graphics processing pipeline is in an embodiment a tile-based rendering pipeline.

The lower level of multi-sampled anti-aliasing that the graphics pipeline is configured to "natively" support (i.e. the "first" level of multisampled anti-aliasing, for which the relevant graphics processing stages process all the sampling points that a fragment represents in a single processing pass) may be any desired level of multi-sampled anti-aliasing. In an embodiment it is configured to support 4×MSAA. To do this, the various processing stages may be, and in an embodiment are, configured as discussed above. Thus, for example, for a tile-based graphics processor configured to support 4×MSAA at full speed, the rasteriser may be configured to be able to test four sample points per pixel per clock cycle, the blenders may be configured to be able to blend four samples per clock cycle, the depth (and stencil) test units may be configured to be able to do depth/stencil checking for four samples per clock cycle, the tile buffers may be sized for four samples per output pixel, the tile writeback may be configured to be able to average four samples per pixel written back to main memory, and any calculation units may be configured to be able to select the correct sample point for centroid mapping, etc., on the basis that 4×MSAA will be being used.

Where other levels of multi-sampled anti-aliasing are to be natively supported, then the various processing stages should be and in an embodiment are correspondingly configured to support that.

The higher level of multi-sampled anti-aliasing that can be (and is being) carried out (i.e. the "higher" level of multisampled anti-aliasing for which the relevant graphics processing stage process the sampling points that a fragment represents in sub-sets) can be any multiple of the level of anti-aliasing that is natively supported. It is in an embodiment an integer multiple of the level of anti-aliasing that is natively supported. Thus it may be, and is in an embodiment, twice and/or four times the natively supported level of anti-aliasing. Thus, where the processing stages of the graphics processing system natively support 4×MSAA, the higher level of anti-aliasing that is performed (and that is able to be performed) in an embodiment comprises 8×MSAA, and/or 16×MSAA.

Thus, in an embodiment, the graphics processing pipeline has a plurality of processing stages that are configured to (natively) support A×MSAA (e.g., and in an embodiment 4×MSAA), and the higher level of multisampled anti-aliasing comprises nA×MSAA, where n is an integer greater than 1. In an embodiment the system can support plural higher levels of anti-aliasing, e.g. for n=2, 4, 8 and 16.

The graphics processing pipeline could be configured to always operate of the higher level of anti-aliasing. However, in an embodiment the arrangement is such that a graphics processing pipeline can selectively be set to operate at the higher level of anti-aliasing in the manner of the technology described herein.

In an embodiment, the graphics processing pipeline can operate at its "native" level of multisampled anti-aliasing, and at a higher level (or levels) of anti-aliasing in the manner of the technology described herein. For example, in an embodiment, a graphics processing pipeline that can operate in the manner of the technology described herein can be selectively configured either to process images for display using 4×MSAA, or using 8×MSAA.

In an embodiment these different modes of operation can be set by the application that is calling for the graphics processing. This would then allow, e.g., an application developer to choose between, say "normal" 4× multisampling, or 8× multisampling. Indeed, it is an advantage of the technology described herein that it facilitates using different multisampling, etc., rates, without the need for significant changes to the processor hardware.

The rasteriser will, as is known in the art, generate graphics fragments to be rendered to generate rendered graphics data for sampling points of the desired graphics output, such as a frame to be displayed. Each graphics fragment that is generated by the rasteriser has associated with it a set of sampling points of the graphics output and is to be used to generate rendered graphics data for one or more of the sampling points of the set of sampling points associated with the fragment.

The sets of sampling points that are associated with each fragment can be selected as desired. As is known in the art, each set of sampling points (and accordingly each sampling point) will represent a location (x, y position) in the graphics output, e.g., frame to be displayed. The pattern and (relative) positions of the sample points in each set of sampling points (the sampling pattern) can also be selected as desired. For example, any known suitable anti-aliasing sampling pattern can be used, such as ordered grid sampling. In an embodiment a rotated grid sampling pattern is used, as that provides a better sampling effect, as is known in the art.

Where, as will typically be the case, the graphics output is to be displayed on an output device having a display or output comprising a plurality of pixels, each set of sampling points that a fragment to be rendered may be associated with in an embodiment corresponds to a set of sampling points for a given pixel (pixel location) of the output device (e.g., display or printer), or to a set of sampling points for a part of a pixel (e.g. a sub-pixel) of the output device. In the latter arrangement, a group of plural of the sets of sampling points in an embodiment make up an overall set of sampling points for a pixel of the display. In these arrangements, each fragment will effectively render fragment data for a given pixel of the output device (e.g., display or printer).

In an embodiment, the sets of sampling points that fragments can be associated with each correspond to a sampling mask (an anti-aliasing mask) or to a part of such a mask, that can be and is intended to be applied to an output to be rendered in the graphics processing system in question. As known in the art, when an image, for example is to be rendered, for display, typically a predefined sampling mask representing a set of sampling points will be repeatedly applied to the image to sample the image. Typically, and in an embodiment, each application of the sampling mask will correspond to a given output pixel of the intended output device (e.g., display or printer).

Thus in an embodiment a given graphics fragment can be associated with (and be used to render) all of the sampling points of a sampling mask (or anti-aliasing mask) that is to be applied; e.g. to an image to be rendered, or can be associated with (and be used to render) a subset of the sampling points of the sampling mask that is to be applied.

The number of sampling points in the sets of sampling points that the graphics fragments to be rendered can correspond to (can represent) can be selected as desired. In an embodiment, each fragment has associated with it a set of sampling points corresponding to the level of anti-aliasing being used. Thus, for example, and in an embodiment, when performing A×MSAA (e.g. 4×MSAA) each fragment generated by the rasteriser will have a set of A (e.g. 4) sampling points associated with it, and when performing the higher level nA×MSAA (e.g. 8×MSAA) each fragment generated by the rasteriser will have a set of nA (e.g. 8) sampling points associated with it.

Thus, in an embodiment of the technology described herein, when performing nA× multisampled anti-aliasing, the rasteriser of the graphics processing pipeline will generate graphics fragments each representing a set of nA sampling points (and pass those fragments to later stages of the graphics processing pipeline for processing), one or more of the later processing stages of the graphics processing pipeline will process each such graphics fragment that represents a set of nA sampling points in a processing pass that processes the nA sampling points that the fragment represents as a whole (in parallel), and one or more other later processing stages of the graphics processing pipeline will process each graphics fragment that represents a set of nA sampling points in one or more processing passes, each such processing pass processing a sub-set (and in an embodiment A) of the sampling points of the set of nA sampling points that the fragment represents.

Thus, in the technology described herein, the fragments that are generated by the rasteriser can in an embodiment be associated with (and correspond to and represent) sets of sampling points that contain different numbers of sampling points.

It will be appreciated that although in many cases in operation of the technology described herein, the set of sampling points that a fragment corresponds to will be completely covered by the object (e.g., primitive) being sampled, this will not always be the case and in that case only some but not all of the sampling points associated with the fragment will be covered by the, e.g., primitive, in question. In the latter case, the rendered fragment data for the fragment should be used for those sampling points that are covered (by the primitive), but not used for those sampling points that are not covered (by the primitive) (since those sampling points will in practice be covered by another, e.g., primitive, of the output), as is known in the art. There would, e.g., be no need to store the rendered fragment data in a rendered fragment data array for those sample positions that are not covered.

Thus, in an embodiment, each graphics fragment has associated with it data indicating which of the sampling points in the set of sampling points that the fragment corresponds to are covered (e.g., and in an embodiment, by the primitive being sampled), i.e. in effect, which of the sampling points in the set of sampling points that the fragment corresponds to, the fragment is being used to render. The system in an embodiment then operates to store the rendered fragment data in a fragment data array for the indicated covered sample positions, but not for the remaining sample positions associated with the fragment.

The information indicating which covered sample points the fragment is being used to render is in an embodiment associated with or part of the fragment data for the fragment that passes through the renderer (such as the RGB and alpha values for the fragment). It is in an embodiment in the form of a coverage mask that indicates, for each sample position of the set of sample positions that is associated with the fragment, whether that sample position is covered, i.e., in effect, whether the fragment is being used to render that sample point (i.e. whether its data should be stored for that sample point). In an embodiment this coverage mask is in the form of a bitmap that represents the sampling positions.

This arrangement has been found to be a particularly convenient way of associating a given fragment with the appropriate sample points.

It would be possible to, e.g., use a different size coverage mask for each different level of anti-aliasing that is supported (i.e. for each different number of sampling positions that a fragment could be associated with), such as a 4-bit coverage mask for 4×MSAA and an nA bit coverage mask for the higher level(s) of anti-aliasing (e.g. an 8-bit coverage mask for 8×MSAA). However, in an embodiment, each fragment is always associated with a coverage mask sized for the higher (or highest) level of anti-aliasing and when performing the lower level(s) of anti-aliasing, appropriate bits in the coverage mask are simply cleared (e.g., and in an embodiment, set to zero). For example, each fragment may be associated with an nA-bit (e.g. 8-bit where 8×MSAA is the highest level of anti-aliasing) coverage mask indicating the sampling points that the fragment is being used to render (as discussed above). Using such a larger coverage mask may be free, for example if the fragment data storage already has capacity for this.

Thus, in an embodiment, each fragment generated by the rasteriser is associated with a sampling point coverage mask corresponding to a higher (and in an embodiment the highest) level of anti-aliasing that can be performed, and when performing lower level (i.e. not the higher (or highest) level of) anti-aliasing, appropriate bits in the coverage mask are cleared. This can simplify the handling of the fragments for different levels of anti-aliasing.

Where this is done, in an embodiment the appropriate upper bits of the larger coverage mask are cleared when carrying out lower level anti-aliasing. For example, in a system that natively supports 4×MSAA, but in which 8×MSAA can be carried out in the manner of the technology described herein, each fragment may be associated with an 8-bit coverage mask which is used in full when performing 8×MSAA, but the upper 4-bits of the coverage mask cleared when performing 4×MSAA.

As well as information relating to the coverage of the sampling points that a given fragment corresponds to, it may also be necessary in the technology described herein to provide information indicating, e.g., the size of the set of sampling points that a fragment corresponds to. This information may be provided as desired, for example, by again associating it with the fragment in question, e.g., using spare capacity that may be available in existing fragment data fields.

The rasteriser may be configured to generate the fragments for rendering in any desired and suitable manner. It will, as is known in the art, receive e.g. primitives to be rasterised, test those primitives against sets of sampling point positions, and generate fragments representing the primitives accordingly.

The rasteriser could be configured to test the required number of sampling points to be associated with a fragment in a single processing pass for each level of anti-aliasing that is supported (i.e. to provide full, "native" rasterisation support for the higher level(s) of anti-aliasing).

However, in an embodiment, the rasteriser is configured to process the set of sampling points to be associated with a fragment for the higher level(s) of anti-aliasing (i.e. the higher level anti-aliasing sampling mask(s)) in plural passes, with each pass testing a (different) sub-set of the sampling points for a fragment (i.e. a sub-set of the sampling mask) (i.e. the rasteriser is in an embodiment configured to run each fragment multiple times when performing the higher level anti-aliasing, so as to test all the required samples).

In other words, for the higher level(s) of anti-aliasing, the rasteriser in an embodiment performs plural rasterisation passes for each fragment to be generated (e.g. for each sampling mask to be tested), each pass testing a sub-set of the set of sampling positions to be generated for the fragment (a sub-mask of the sampling mask), and then combines the results of these rasterisation passes to generate the fragment that is passed onto the rest of the graphics pipeline. Thus the rasteriser in an embodiment tests plural "sub-fragments", that are then combined to give the fragment that is output by the rasteriser.

In this arrangement, the number of sampling points of the fragment (of the sampling mask) that are processed in each rasterisation pass can be selected as desired. In an embodiment, the number of sampling points (the sub-set of sampling points) that are processed in each pass comprises the number of sampling points that would be processed for the level of anti-aliasing that the graphics processing pipeline natively supports. Thus, for example, for a pipeline that natively supports A×MSAA (e.g. 4×MSAA), each rasterisation pass when performing a higher level of anti-aliasing in an embodiment processes A (e.g. 4) sampling points of the fragment to be generated.

The number of rasterisation passes used to generate a fragment should correspond to the number of processing passes needed to process all the sampling points to be associated with a fragment. Thus, for example, for a processing pipeline that natively supports A×MSAA, when carrying out nA×MSAA (where n is an integer greater than one), the rasteriser should carry out n rasterisation passes (with each rasterisation pass processing a different sub-set of A sampling positions of the nA sampling positions to be associated with the fragment) to generate each rasterisation output fragment.

Thus, the rasteriser is in an embodiment configured to be able to, when performing the higher level anti-aliasing, rasterise a primitive into plural "sub-fragments", each representing a (different) sub-set of the sampling points to associated with a fragment to be output by the rasteriser, and to then combine the so-generated sub-fragments into output fragments for passing to a next stage of the graphics processing pipeline.

Thus, for example, for 8×MSAA in a pipeline that natively supports 4×MSAA, the rasteriser will perform two rasterisation passes, with one rasterisation pass, e.g., and in an embodiment, testing the upper half of the 8× sampling mask, and the other rasterisation pass testing the lower half of the 8× sampling mask. Similar arrangements can be used for other higher levels of MSAA. To support such operation, the rasteriser should be, and is in an embodiment, configured to support the additional "sub-mask" sampling patterns.

This rasteriser operation may require a very small addition of control logic and additional entries in the sample location look-up table (to indicate the additional sampling patterns that are required for the higher level(s) of anti-aliasing). The rasterisation performance will also be reduced in proportion to the number of additional rasterisation passes required (so by half, if performing 8×MSAA using a "native" 4×MSAA rasteriser). However, as discussed above, the Applicants believe this will be acceptable in comparison to, e.g., providing full, "native" rasterisation support for the higher level(s) of anti-aliasing.

The fragments generated by the rasteriser are passed to later stages of the graphics processing pipeline for processing, to generate rendered fragment data for (covered) sampling points that the fragments represent, as is known in the art. These rendering processes may include, for example, fragment shading, blending, texture-mapping, etc.

As discussed above, in the technology described herein, some of these later processing stages are configured to (always) process the fragments as a whole in a processing pass, but some are configured, when performing a higher level of anti-aliasing, to process the fragments in "parts", in plural passes.

The later processing stages of the graphics processing pipeline (relative to the rasteriser) where a graphics fragment is processed as a whole in a (single) processing pass when carrying out the higher level anti-aliasing (and all levels of anti-aliasing) in an embodiment comprise one or more of, and in an embodiment all of, the graphics processing stages that operate on a per fragment basis rather than on a per sample basis. The Applicants have recognised that for processing stages that operate on a per fragment basis, carrying out such processing on parts of fragments, and then, e.g., recombining the fragment parts, can lead to a different result to if the fragment is processed as a whole. It is therefore better for these stages of the graphics processing pipeline to process fragments representing higher numbers of sampling positions when carrying out higher level anti-aliasing as a whole, in a single processing pass.

Fragment shading is one such processing stage that operates on fragments as a whole. Thus, in an embodiment, when carrying out the higher level anti-aliasing, the fragment shader is configured to process each fragment as a whole, in a processing pass.

Another processing stage which operates on whole fragments is the varying interpolator, at least when it, e.g., selects a sample point for centroid mapping. Thus, in an embodiment, the varying interpolator operates on whole fragments in a processing pass, when the higher level anti-aliasing is being performed, at least when selecting a sample point for centroid mapping. This will then allow the varying interpolator to, inter alia, select the sample point for centroid mapping that is correct for "true" higher level anti-aliasing. (When not performing centroid mapping, the varying interpolator does not need to operate on the fragment as a whole, and so in this case a fragment could instead be processed in parts, in plural passes, if desired.)

In order to facilitate this, the varying interpolator should be configured to be able to handle the larger number of bits needed when performing the higher level anti-aliasing, and its corresponding sample location look-up table expanded accordingly. For example, in the case of going from 4×MSAA to 8×MSAA, the varying interpolator bit scanner will need to handle an additional 4 bits, and there will need to be an additional 8 entries in the constant sample location look-up table.

Thus, in an embodiment, the processing stages that always process each graphics fragment that they receive for processing in a processing pass that processes all the sampling points that the fragment represents as a whole comprise one or more, and in an embodiment all of, the fragment shader and the varying interpolator.

The later stage or stages of the graphics processing pipeline (relative to the rasteriser) where a fragment is processed in one or more processing passes, each pass processing a sub-set of the sampling points associated with the fragment, when carrying out higher level anti-aliasing, in an embodiment comprise a later stage or stages, and in an embodiment all the later stages, of the graphics processing pipeline that perform per-sample (per-sampling point) (rather than per-fragment) operations on a fragment that passes through the pipeline.

The Applicants have recognised that as per-sample operations are carried on the sampling points individually, it is possible to carry out those operations on the sampling points of a fragment separately (i.e. not on the fragment as a whole in one processing pass) and still remain compliant with "true" higher order anti-aliasing. Thus for the per-sample operations in the graphics processing pipeline, it is possible to achieve higher levels of anti-aliasing by running those operations multiple times per fragment. Moreover, doing it that way reduces significantly the hardware cost of supporting the higher level of anti-aliasing.

Thus, in an embodiment, the later graphics processing stages (relative to the rasteriser) that subject each fragment to one or more processing passes, each pass processing a sub-set of the sampling points that the fragment represents, when performing higher level anti-aliasing comprise one or more of, and in an embodiment all of: the blender (or blenders); and the depth (or depth and stencil) tester or testers. Where the pipeline includes both early and late depth (or depth and stencil) testers, then in an embodiment both the early and late testers are configured to operate in this manner.

(Although in an embodiment all the per-sample operation stages of the graphics processing pipeline operate in this manner, other arrangements, such as providing native support for higher levels of anti-aliasing in some stages, but operating others in this manner would be possible, if desired, when performing the higher level anti-aliasing.)

Where a graphics processing stage is configured to process each fragment in one or more passes, each pass processing a sub-set of the sampling positions associated with the fragment (i.e. processing some but not all of the set of sampling positions associated with the fragment), then the number of sampling points of the fragment that are processed in each pass can be selected as desired. In an embodiment, the number of sampling points (the sub-set of sampling points) that are processed in each pass comprises the number of sampling points that would be processed for the level of anti-aliasing that the graphics processing pipeline stage natively supports. Thus, for example, for a pipeline stage that natively supports A×MSAA (e.g. 4×MSAA) each processing pass when performing a higher level of anti-aliasing in an embodiment processes A (e.g. 4) sampling points of the fragment.

The number of processing passes used to process a fragment should be up to the number of processing passes needed to process all the sampling points associated with the fragment. Thus, for example, for a processing pipeline stage that natively supports A×MSAA, when carrying out nA×MSAA (where n is an integer greater than one), each fragment should undergo up to n processing passes in the graphics processing stage in question (with each processing pass processing a different sub-set of A sampling positions of the nA sampling positions associated with the fragment).

It would be possible simply always to have the fragments undergo the number of processing passes necessary to process all the sampling points associated with a fragment (so n processing passes in the above example), and in one embodiment, this is done. However, in an embodiment it is possible to omit and/or abort a processing pass for a sub-set of the sampling positions for which none of the sampling positions is actually covered (i.e. where none of the sampling positions of the sub-set will actually (potentially) contribute to the output). In this case, an "early-out" mechanism could be used to skip such redundant processing passes. In these arrangements, a given fragment will accordingly be processed by performing one or more processing passes, up to the number of processing passes necessary to process all the sampling points associated with a fragment.

The later graphics processing stages can be configured to operate in this manner in any suitable and desired manner. For example, in the case of the blender(s), the blender can be configured to run each fragment multiple times, so as to blend all the desired samples. Similarly, in the case of the depth, and/or depth and stencil, test(s), the depth or depth and stencil tester(s) can be configured to run each fragment multiple times, so as to test all the desired samples. The cost for this is a small amount of control code, although the maximum blend or testing, etc., rate will be reduced correspondingly to the number of processing passes that need to be performed for each fragment (so by half, if performing 8×MSAA using a "native" 4×MSAA blender, etc.).

To facilitate such operation, the blender(s) and/or depth and stencil tester(s), etc., are in an embodiment configured to be able to split input fragments that they receive for processing from a preceding stage of the graphics processing pipeline into plural sub-fragments each representing a (different) sub-set of the sampling points associated with the input fragment, to then process the sub-fragments independently of each other (and in an embodiment one-after-another), and to then recombine the processed sub-fragments into output fragments for passing to a next stage of the graphics processing pipeline.

Thus, in an embodiment, one or more of the processing stages of the graphics processing pipeline are configured to be able to split input fragments that they receive for processing from a preceding stage of the graphics processing pipeline into plural sub-fragments, each representing a (different) sub-set of the sampling points associated with the input fragment, to then process the sub-fragments independently of each other (and in an embodiment one-after-another), and to then recombine the processed sub-fragments into output fragments for passing to a next stage of the graphics processing pipeline. These stages are in an embodiment stages that perform per-sample operations, such as the blender(s), depth (or depth and stencil) tester(s), etc.

As discussed above, the blender, etc., in an embodiment also includes a mechanism to abort or skip a processing pass for a sub-set of sampling points that will not actually contribute to the output for the fragment in question.

Once the generated fragments have been rendered so as to generate rendered graphics data for the respective sampling points that the fragment represents, the so-generated rendered fragment data will then need to be stored in a suitable sample data array or buffer, such as a tile and/or frame buffer, for subsequent output, e.g. to a display device, as is known in the art. This array should, as is known in the art, represent a two-dimensional array of, e.g., sampling positions, that can then be processed appropriately to, e.g., display a 2D array of pixels.

As will be appreciated by those skilled in the art, where the technology described herein is used to process an image at a higher level of anti-aliasing, say 8× sampling, as against 4× sampling, that will result in rendered fragment data for more (e.g. twice as many) sampling positions. This "extra" sampling position data will need to be stored in the sample data array, e.g. tile buffers.

One way to do this would be simply to increase the size of the rendered fragment data array to allow for this. Thus, for example, in a tile-based system, the tile buffer(s) (and any other end of pipeline buffers, such as a depth buffer) could be increased in size (e.g. doubled) to be able to accommodate all the sampling positions needed for an entire tile at the desired higher level(s) of anti-aliasing. It would also or instead be possible, e.g., to use single instead of double-buffering (where double-buffering is supported) to provide capacity for the additional sample data.

However, in an embodiment, in a tile-based rendering pipeline, rather than increasing the size of the tile buffers, etc., so as to accommodate the additional sampling positions for higher levels of anti-aliasing, instead, each tile is processed in plural smaller parts, i.e. in effect as a plurality of "sub-tiles", each representing a part of a tile to be rendered. Each such tile part ("sub-tile") can then be written out to main memory (e.g. the frame buffer) once it is processed in the normal manner, and the next tile part (sub-tile) then processed and written out, and so on. This will then allow higher level anti-aliasing to be performed without the need to increase the size of the tile buffers, etc. (albeit at the cost of having to process each "tile" multiple times).

In these arrangements, where the graphics processing pipeline is to process each rendering tile in plural smaller parts, then the size of the tile part that is processed each time can be selected as desired. In an embodiment, where the tile buffers, etc., are configured to natively support a particular size of tile at a particular level of anti-aliasing, the tile part (the "sub-tile") that is processed each time when performing higher level anti-aliasing corresponds to the tile part that will fill the existing tile buffer(s). Thus, for example, for a pipeline having tile buffer(s) that natively support A×MSAA then when processing a tile using nA×MSAA, the tile should be processed in parts each corresponding to 1/n of the tile.

The number of parts ("sub-tiles") that are used to process a tile should correspondingly be the number of parts needed to process the entire tile parts. Thus, for example, for a processing pipeline having tile buffers that natively support A×MSAA, when carrying out nA×MSAA (where n is an integer greater than one), each tile should be processed in n parts (as n="sub-tiles") (with each part (sub-tile) corresponding to 1/n of the tile).

Thus, for example, in the case of carrying out 8×MSAA in a graphics processing pipeline having tile buffers sized and configured to support 4×MSAA, each tile is in an embodiment rendered twice, i.e. using two rendering passes, with each rendering pass rendering half the tile. For example, a first rendering pass could render the upper half of the tile and the second rendering pass the lower half of the tile (or vice-versa). For other levels of multisampled anti-aliasing, the appropriate number of rendering passes should be performed.

The graphics processing pipeline can be configured as desired to do this. In an embodiment, the rasteriser is configured to read the tile list for the tile multiple times, but to each time process a different part of the tile. The cost for this would be a small amount of control logic and the need to run through the tile list (all the primitives in the tile) multiple times. The rasteriser (the rasterisation process) is in an embodiment configured to be able to efficiently drop the part of the tile which is not to be processed for a given rendering pass. In an embodiment, a hierarchical rasterisation process is used, as a hierarchical rasterisation process can do this efficiently.

Once the sample, e.g. tile, buffers have been filled, they will need to be written back to main memory (e.g. to a frame buffer), as is known in the art. There may also be, as is known in the art, downsampling (averaging), either in a fixed or in a variable fashion, from the sample values in the (e.g. tile) buffer to the final output (pixel) value to be written to the main memory (e.g. frame buffer) and/or other output, if desired.

The downsampling (averaging) to resolve the sample values to the pixel values to be written out to main memory could be configured to natively support the higher levels of anti-aliasing to be used (i.e. to be able to downsample (average) the required number of sampling points for the higher level(s) of anti-aliasing in a single downsampling operation), if desired. However, in an embodiment, the downsampling is configured to still operate at a lower, natively-supported level of downsampling (anti-aliasing) when performing higher level anti-aliasing, with the higher level anti-aliasing downsampling operation being achieved by operating the downsampling (averaging) operation multiple times, for different parts of the tile, and then combining the results to give the overall output pixel value to be written back to the main memory.

Thus, for example, for a downsampling (averaging) unit configured for 4×MSAA, when performing 8×MSAA, the downsampling should be run twice, once for each different set of 4 sampling points of the 8×MSAA set of sampling points (once for each "sub-pixel"), and then the resulting downsampled (averaged) two values blended together (averaged) in another downsampling pass to give the output (final pixel) value that is written out to main memory. In other words, for each 8×MSAA pixel, the sample value averaging is done in multiple passes, to generate the final pixel value that should be written back to main memory. (This is effectively equivalent to the mechanism for doing (2×(4× MSAA))+2×SSAA).)

Thus, when performing higher level anti-aliasing, the tile downsampling (resolving) and writeback operation is in an embodiment configured to be done in plural, successive, stages. The first stage in an embodiment downsamples (averages) plural sub-sets of the set of sampling points for a fragment separately, with each sub-set in an embodiment containing the number of sampling points that the downsampling unit is configured to natively downsample. The resulting so-downsampled (averaged) values are in an embodiment then downsampled (averaged) in a further downsampling (averaging) process (which again in an embodiment downsamples (averages) sets of values up to the number of values that the downsampling unit natively downsamples), and so on (if required), until a single downsampled (averaged) output value for the set of sampling points for an (output) pixel is obtained, which single value is then written back appropriately to the main memory.

Thus, where the tile downsampling and writeback unit is configured to support the downsampling (averaging) of A values (i.e. A×MSAA), then for higher level anti-aliasing, the set of sampling points for a fragment will in an embodiment be downsampled as plural, separate parts, each containing A sampling points. If following this there are A or fewer output values, those values will be downsampled (averaged) in a single further downsampling operation to give the output downsampled value that is written back to the main memory. On the other hand, if following this there are more than A output values, those output values are then in an embodiment downsampled again as plural separate parts, each containing (up to) A values. Then, if following this there are A or fewer output values, those values will be downsampled (averaged) in a single further downsampling operation to give the output downsampled value that is written back to the main memory (or if following this there are more than A output values, those output values are then in an embodiment downsampled as plural separate parts, each containing (up to) A values, and so on).

The Applicants have recognised that such downsampling (resolving) of the sample values in a multiple stage process can correctly replicate the effect of downsampling all the sample values for the higher level of anti-aliasing in a single step.

The technology described herein can be used for all forms of output that a graphics processing pipeline may be used to generate, such as frames for display, render-to-texture outputs, etc.

It will be appreciated that as an output to be rendered by the graphics processing pipeline will typically be made up of plural primitives (and tiles in a tile-based system), in practice the method of the technology described herein will be repeated for each primitive (and tile) making up the output, so that eventually an appropriate set of rendered fragment data has been generated for each sampling point of the output that is needed.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or processing circuitry and/or programmable hardware elements and/or processing circuitry that can be programmed to operate in the desired manner.

It should also be noted here that, as will be appreciated by those skilled in the art, the various functions, etc., of the technology described herein may be duplicated and/or carried out in parallel on a given processor.

The technology described herein is applicable to any form or configuration of graphics processing pipeline and to all forms of rendering, such as immediate mode rendering, deferred mode rendering, tile-based rendering, etc. It is particularly applicable to graphics renderers that use deferred mode rendering and in particular to tile-based renderers. The technology described herein may be particularly advantageous in the case of tile-based renderers, as tiled renderers generally have much lower memory bandwidths for frame buffers than immediate mode renderers. The technology described herein can allow an efficient tiled-renderer to perform higher levels of anti-aliasing with a lower cost than would otherwise be required.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

In some embodiments, the data processing system, graphics processing system, graphics processing pipeline, processing stages, data processors, graphics processors, processing circuitry, apparatus, etc., of the technology described herein may be in communication with memory and/or one or more memory devices that store the data described herein, such as the sampling point, fragment and/or pixel data, etc., and/or that store software for performing the processes described herein. The data processing system, graphics processing system, graphics processing pipeline, processing stages, data processors, graphics processors, processing circuitry, apparatus, etc., may also be in communication with a display for displaying images based on the sampling point, fragment and/or pixel data, etc.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program comprising computer software code for performing the methods herein described when the program is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

An embodiment of the technology described herein will now be described in the context of the processing of computer graphics for display.

As is known in the art, and as discussed above, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

The present embodiment is particularly concerned with facilitating anti-aliasing operations when, inter alia, displaying computer graphics images. As is known in the art, anti-aliasing is carried out by taking plural samples of an image to be displayed and then downsampling those samples to the output resolution of the display.

Figure 3:
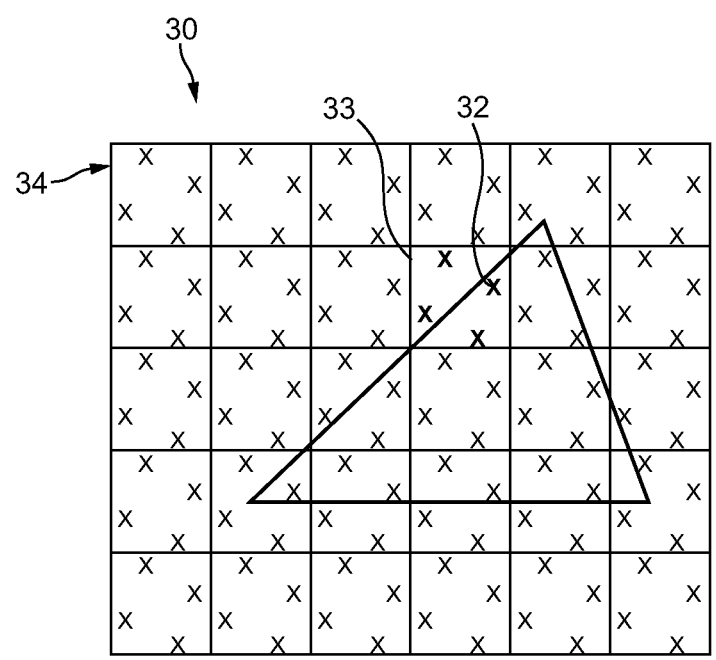
FIG. 3 shows schematically an image to be displayed.

FIG. 3, which shows schematically the basic anti-aliasing arrangement that is used in the present embodiment, shows the repeated application of a sampling mask 34 to an image to be displayed. Each application of the sampling mask 34 corresponds to a pixel of the image as it will be displayed.

Each sampling mask includes, as is known in the art, a set of sampling points that will be used to sample the image for the output pixel in question and accordingly determine how the pixel is to be displayed on the final display.

Figure 4:
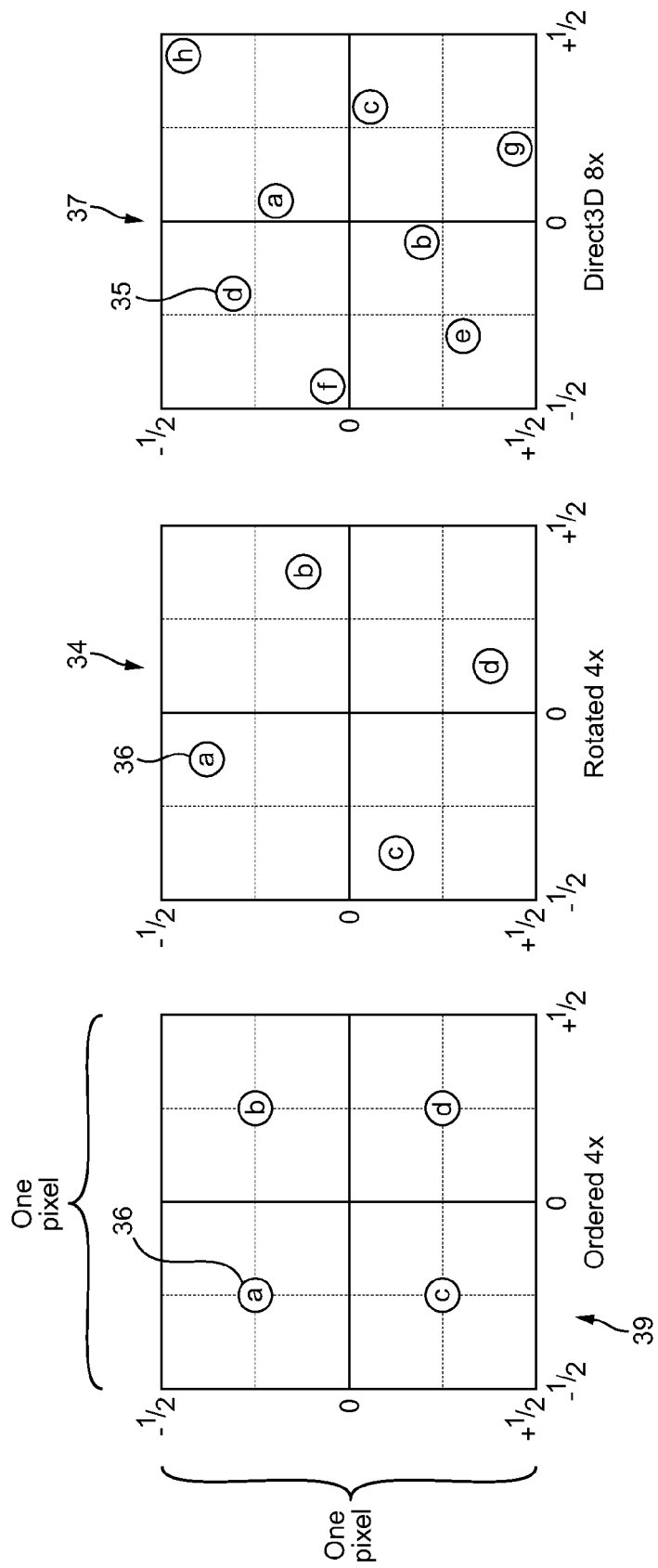
FIG. 4 shows exemplary sampling patterns for use in an embodiment of the technology described herein.

In the present embodiment, each instance of the sampling mask 34 can either take 8 sampling points or can take 4 sampling points of the image. FIG. 4, which shows an expanded view of these sampling masks, illustrates this.

FIG. 4 shows an 8× sampling mask 37 which represents an array of 8 sampling positions 35 for a given pixel. The 8× mask 37 is the sampling mask that is defined for Direct3D 11. FIG. 4 also shows two 4× sampling masks 39 (having an ordered grid), and 34 (having a rotated grid), which each represent a set of 4 sampling positions 36.

As will be discussed further below, in the present embodiment an image can be processed using any one of the 4× and the 8× sampling masks shown in FIG. 4.

FIG. 3 also shows an image overlaid on the sampling mask array 30 in the form of a single primitive 32. (It will be appreciated here that the image has been shown in FIG. 3 as comprising a single primitive for simplicity. In practice the image (or other output) may and typically will comprise many, overlapping, primitives, as is known in the art.) As can be seen from FIG. 3, the primitive 32 overlies some of the sampling masks in the sampling mask array 30 completely, but only passes through part of some of the other sampling masks.

To process the primitive 32 of the image, the rendering system will, in essence, determine at the rasterisation stage which of the sample points in each set of sample points of each sampling mask application are covered by the primitive 32, and then render and store data for those covered sample points so that the image of the primitive 32 can be properly displayed on the display device.

Figure 5:
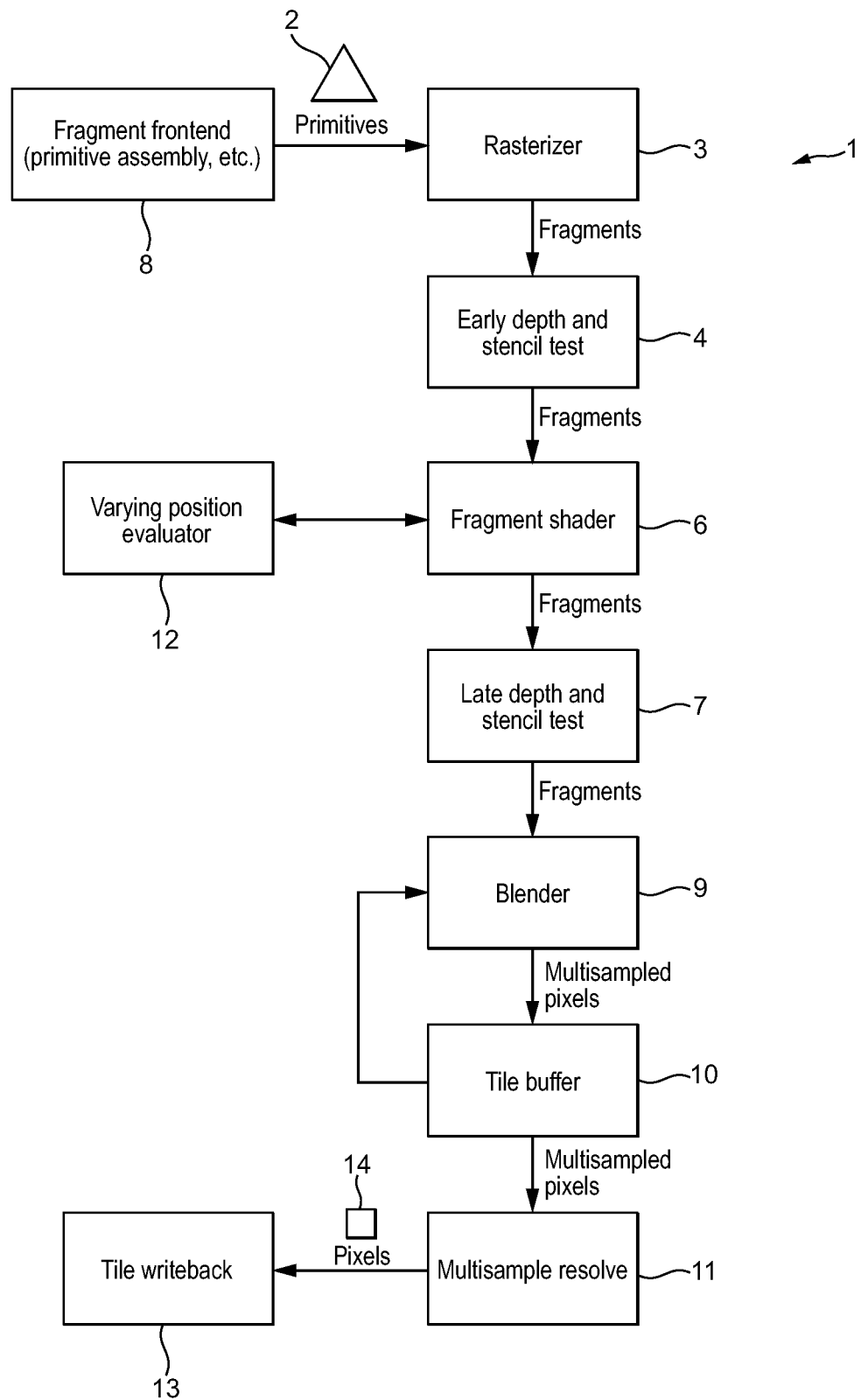
FIG. 5 shows an embodiment of a graphics processing pipeline that can be operated in accordance with the technology described herein.

The processing of the image of the primitive 32 for display in this manner in the present embodiment will now be described with reference to FIG. 5 which shows schematically a graphics processing pipeline 1 that may operate in accordance with the technology described herein. The graphics processing pipeline 1 shown in FIG. 5 is a tile-based renderer and will thus, as is known in the art, produce tiles of a render output data array, such as an output frame to be generated. (As will be appreciated by those skilled in the art, other rendering arrangements can be used, if desired.)

(As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

FIG. 5 shows the main elements and pipeline stages of the graphics processing pipeline 1 that are relevant to the operation of the present embodiment. As will be appreciated by those skilled in the art there may be other elements of the graphics processing pipeline that are not illustrated in FIG. 5. It should also be noted here that FIG. 5 is only schematic, and that, for example, in practice the shown functional units and pipeline stages may share significant hardware circuits, even though they are shown schematically as separate stages in FIG. 5. It will also be appreciated that each of the stages, elements and units, etc., of the graphics processing pipeline as shown in FIG. 5 may be implemented as desired and will accordingly comprise, e.g., appropriate circuitry and/or processing logic, etc., for performing the necessary operation and functions.

FIG. 5 shows schematically the pipeline stages after the graphics primitives (polygons) 2 for input to the rasterisation process have been generated. Thus, at this point the graphics data (the vertex data) has undergone fragment frontend operations 8, such as transformation and lighting operations (not shown), and a primitive set-up stage (not shown) to set-up the primitives to be rendered, in response to the commands and vertex data provided to the graphics processor, as is known in the art.

As shown in FIG. 5, this part of the graphics processing pipeline 1 includes a number of stages, including a rasterisation stage 3, an early Z (depth) and stencil test stage 4, a fragment shading stage 6, a late Z (depth) and stencil test stage 7, a blending stage 9, tile buffers 10 and a downsampling and writeback (multisample resolve) stage 11.

As discussed above, the technology described herein is concerned with the use of graphics processing pipelines that have processing stages configured to "natively" support a first level of anti-aliasing to carry out a second, higher level of anti-aliasing when processing an output to be generated by the graphics processing pipeline. In the present embodiment, it is assumed that stages of the graphics processing pipeline 1 natively support 4×MSAA, and that the higher level of anti-aliasing that is to be carried out in the manner of the technology described herein is 8×MSAA. Other arrangements would, of course, be possible.

The rasterisation stage 3 of the graphics processing pipeline 1 operates, as is known in the art, to rasterise the primitives making up the render output (e.g. the image to be displayed) into individual graphics fragments for processing. To do this, the rasteriser 3 receives graphics primitives 2 for rendering, rasterises the primitives to sampling points and generates graphics fragments having appropriate positions (representing appropriate sampling positions) for rendering the primitives.

In the present embodiment, the rasteriser is a hierarchical rasteriser that operates to iteratively test primitives against progressively smaller patches of fragments. It operates by starting with a large patch of the output area and testing if the primitive in question is inside that patch. If not, the entire patch is discarded, and the next patch tested, and so on. On the other hand, if a primitive is found to be within the patch (to be covered, at least in part, by the patch), the patch is divided into 4 parts, each such "sub-patch" is then tested in the same way, and so on, until a minimum patch size is reached (which in the present embodiment is a 2×2 group of sampling masks (i.e. corresponds to a 2×2 group of fragments) (but which could, e.g., be an individual sample, an individual sampling mask (fragment), or a different sized group of sampling masks (fragments)).

As in this embodiment the smallest patch size contains plural sampling points (i.e. is a 2×2 group of sampling masks (fragments)), the individual sampling points in the final patch are then tested using a separate sample tester. In the present embodiment, this sample tester of the rasteriser 3 is configured to be able to test sampling masks containing four sampling points per clock cycle (i.e., in effect, to test the set of four sampling points that will be associated with a fragment that would be generated for the set of four sampling points if at least one of them is within the primitive), and thus the rasteriser 3 "natively" supports 4×MSAA.

This "hierarchical" rasterisation mechanism allows the rasteriser to quickly discard empty patches (and accordingly to focus quickly on the parts of a tile where a primitive actually is).

The rasteriser generates a fragment for each application of the sampling mask found to include the primitive. These fragments are then sent onwards to the rest of the pipeline for processing.

The early Z/stencil stage 4 performs, is known in the art, a Z (depth) test on fragments it receives from the rasteriser 3, to see if any fragments can be discarded (culled) at this stage. To do this, it compares the depth values of (associated with) fragments issuing from the rasteriser 3 with the depth values of fragments that have already been rendered (these depth values are stored in a depth (Z) buffer that is part of the tile buffers 10) to determine whether the new fragments will be occluded by fragments that have already been rendered (or not). At the same time, an early stencil test is carried out.

The early depth and stencil test 4 is configured to be able to do depth and stencil testing for four samples per clock cycle, and thus "natively" supports 4×MSAA.

Fragments that pass the fragment early Z and stencil test stage 4 are then sent to the fragment shading stage 6. The fragment shading stage 6 performs the appropriate fragment processing operations on the fragments that pass the early Z and stencil tests, so as to process the fragments to generate the appropriate fragment data, etc., for the render output (e.g. for display of the fragments), as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 6 is in the form of a shader pipeline (a programmable fragment shader), but other arrangements, such as the use also or instead of fixed function fragment shading units would be possible, if desired.

The fragment shader 6 is configured to process all the sampling points associated with a fragment that it receives in parallel, i.e. to process each fragment that it receives as a whole.

The fragment shading stage 6 has associated with it a varying interpolator (a varying position evaluator) 12 which is used to determine the correct varying value for the current fragment. For certain interpolation modes, such as centroid mapping, the varying interpolator uses the fragment's associated coverage mask to select the correct position within the fragment to interpolate the varying data for. Thus, the varying interpolator 12 is configured to be able to process all the sampling points associated with a fragment that it receives in parallel, so as to be able to select the correct interpolation position for centroid mapping whether a fragment has four or eight sampling points associated with it.

There is then a "late" fragment Z and stencil test stage 7, which carries out, inter alia, an end of pipeline depth test on the shaded fragments to determine whether a rendered fragment will actually be seen in the final image. This depth test uses the Z-buffer value for the fragment's position stored in the Z-buffer in the tile buffers 10 to determine whether the fragment data for the new fragments should replace the fragment data of the fragments that have already been rendered, by, as is known in the art, comparing the depth values of (associated with) fragments issuing from the fragment shading stage 6 with the depth values of fragments that have already been rendered (as stored in the depth buffer). This late fragment depth and stencil test stage 7 also carries out any necessary "late" alpha and/or stencil tests on the fragments.

The late depth and stencil testing stage 7 is also configured to be able to do depth and stencil testing for four samples per clock cycle, and thus "natively" supports 4×MSAA.

The fragments that pass the late fragment test stage 7 are then subjected to, if required, any necessary blending operations with fragments already stored in the tile buffers 10 in the blender 9. Any other remaining operations necessary on the fragments, such as dither, etc. (not shown) are also carried out at this stage.

The blender 9 is configured to be able to blend four samples per clock cycle, and thus "natively" supports 4×MSAA.

Finally, the (blended) output fragment data (values) are written to the tile buffers 10 from where they can, for example, be output to a frame buffer for display. The depth value for an output fragment is also written appropriately to a Z-buffer within the tile buffers 10. (The tile buffers and Z-buffer will store, as is known in the art, an appropriate colour, etc., or Z-value, respectively, for each sampling point that the buffers represent (in essence for each sampling point of a tile that is being processed).) The tile buffers store, as is known in the art, an array of fragment data that represents part of the render output (e.g. image to be displayed).

In the present embodiment, three tile buffers are provided. Each tile buffer stores its fragment data in a 32×32 array (i.e. corresponding to a 32×32 array of sample positions in the output to be generated, e.g., in the image to be displayed). Each 32×32 data position tile buffer can accordingly correspond to (and will "natively" support) a 16×16 pixel "tile" of, e.g., the frame to be displayed, at 4× anti-aliasing (i.e. when taking 4 samples per pixel).

These tile buffers may be provided as separate buffers, or may in fact all be part of the same, larger buffer. They are located on (local to) the graphics processing pipeline (chip).

In this embodiment, two of the three tile buffers are used to store colour (red, green, blue) values for each sampling point (it would be possible to use one tile buffer for this purpose), and one tile buffer is used to store Z (depth) values and stencil values for each sampling point. Other arrangements would, of course, be possible.

The data from the tile buffers 10 is input to a downsampling (multisample resolve) unit 11, and thence output (written back) to an output buffer 13 (that may not be on the graphics processing platform itself), such as a frame buffer of a display device (not shown). (The display device could comprise, e.g., a display comprising an array of pixels, such as a computer monitor or a printer.)

The downsampling unit 11 downsamples the fragment data stored in the tile buffers 10 to the appropriate resolution for the output buffer (device) (i.e. such that an array of pixel data corresponding to the pixels of the output device is generated), to generate output values (pixels) 14 for output to the output buffer 13.

The downsampling unit 11 in the graphics processing pipeline 1 in the present embodiment is configured to be able to in one downsampling operation (clock cycle) downsample four sample position values from the tile buffer 10 to a single output value, e.g. 14 for output to the output buffer 13. Thus the downsampling and writeback unit 11 is configured, in the present embodiment, to "natively support" 4× anti-aliasing.

This downsampling can take place in any suitable manner. In the present embodiment linear blending of the data is used to downsample it. However, other arrangements would be possible, if desired. If needed, the downsampling unit 11 may also apply appropriate gamma correction to the data that it outputs to the output buffer 13, or this may be done, e.g., as a fragment shading operation, or in any other suitable and desired manner.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed).

Other arrangements for the graphics processing pipeline 1 would, of course, be possible.

The operation of the graphics processing pipeline shown in FIG. 5 in accordance with an embodiment of the technology described herein will now be described.

The operation of the graphics processing pipeline 1 when carrying out 4×MSAA will first be described, and then the operation when carrying out 8×MSAA will be described.

Figure 6:
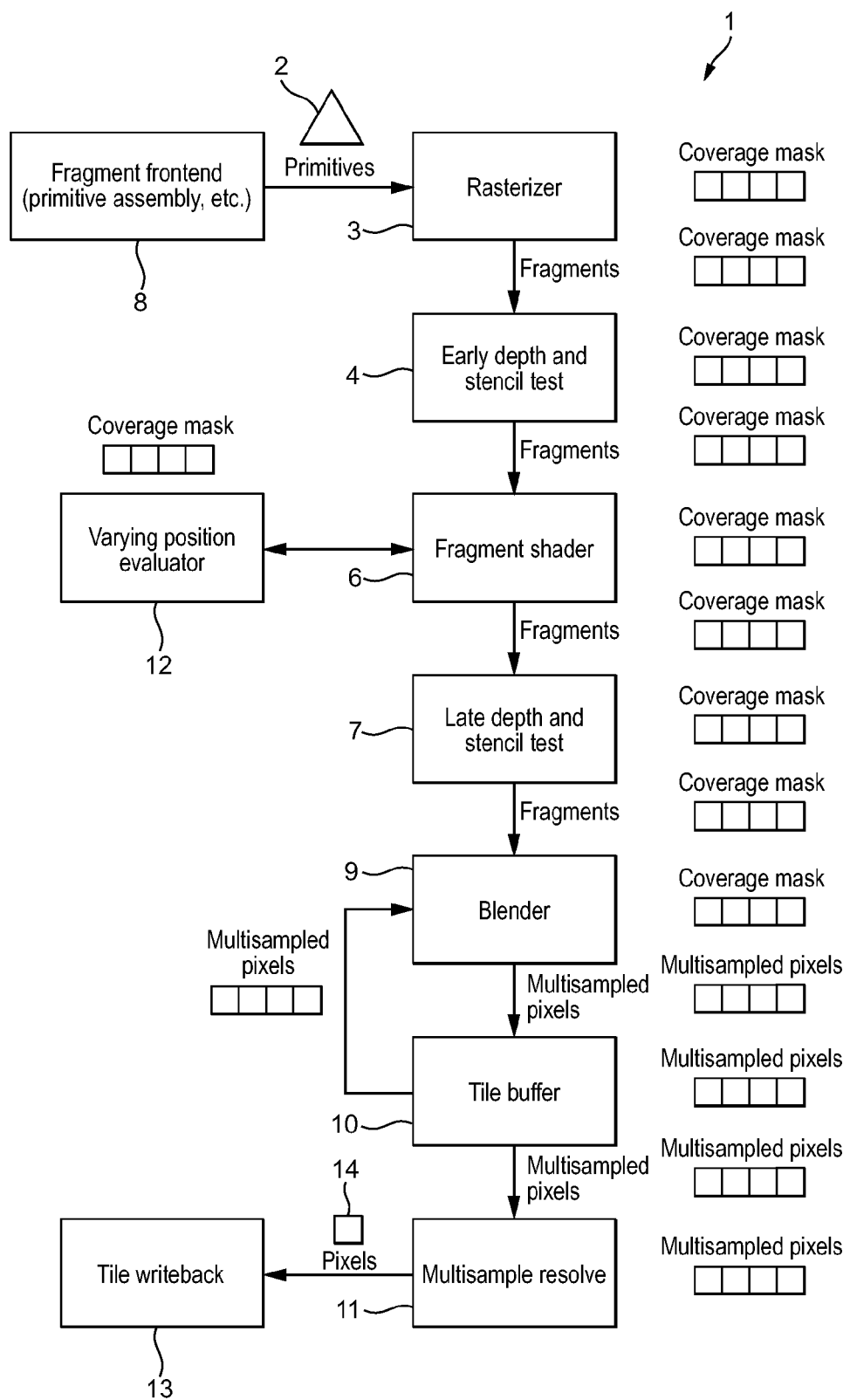
FIG. 6 shows schematically the operation of the graphics processing pipeline of FIG. 5 when performing 4×MSAA.

FIG. 6 shows schematically the operation of the graphics processing pipeline 1 when carrying out 4×MSAA.

As shown in FIG. 6, as 4×MSAA is being carried out, the rasteriser 3 will apply (test) sampling masks having four sample positions (i.e. 4× sampling masks) to the output to be generated, and associate each fragment that it generates for rendering with a set of four sample points corresponding to a given application of the sampling mask. In other words, a single fragment is used to render all four sample points of a set of sample points of a given application of the sampling mask (and accordingly of a pixel in the output) together in one go.

Thus, in the present example, considering the image comprising the primitive 32 shown in FIG. 3, the rasteriser 3 will receive that primitive from the fragment frontend processing stages 8 of the graphics processing system, and then determine which sets of sampling points of the image (i.e. in effect which applications of the sampling mask 34 in the array 30) include sampling points that are covered by the primitive 32. (This may be carried out in any appropriate manner known in the art.) The rasteriser 3 will then generate a fragment for each application of the sampling mask found to include a sampling point that is covered by the primitive 32. Thus the rasteriser 3 will generate fragments associated with sets of four sampling points. It will then output those fragments to the later stages of the graphics processing pipeline 1 for processing.

Figure 7:
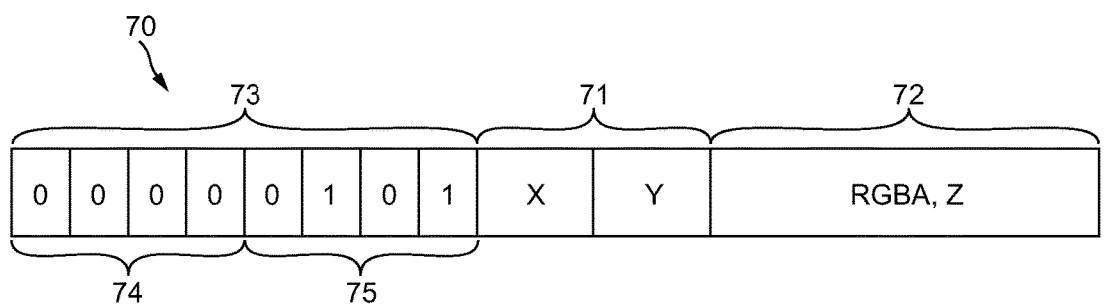
FIG. 7 illustrates the data that is associated with a fragment to be rendered in an embodiment of the technology described herein.

FIG. 7 shows schematically the data 70 that is generated for and associated with each fragment generated by the rasteriser 3. As shown in FIG. 7, the data that is associated with each fragment includes, inter alia, the x,y position 71 of the fragment (which represents the x,y position in the image of the set of sampling points (the application of the sampling mask) that the fragment corresponds to (in practice in the present embodiment of the relevant pixel in the output frame)), together with the necessary per fragment data 72, such as the colour (RGB), transparency (alpha), depth (z) and stencil values for the fragment. This per fragment data 72 is, as is known in the art, used by and appropriately modified by the later processing stages of the graphics processing pipeline 1 to provide the output set of fragment data for the fragment that is then stored in the tile buffers 10. (FIG. 7 shows a single depth (Z) value for the fragment. It would instead be possible, e.g., to have or calculate a separate depth (Z) value for each sampling position associated with the fragment, if desired.)

The data 70 that is associated with the fragment also includes a coverage mask 73 that is in the form of a bit array representing each of the sample positions within the set of sample points (the sample mask) that the fragment is associated with and corresponds to. Each position in the bit array coverage mask 73 is set to "1" if the corresponding sample position is found to be covered by the primitive in question at the rasterisation stage, and to "0" if the sample position is not covered by the primitive in question. This allows the rendering process to know which of the sample points associated with a given fragment are in fact covered by the primitive in question, so that the rendering process can ensure that the rendered fragment data for a fragment is only used (and, e.g. stored) for the sample points that are covered by the primitive.

This is necessary, because, as can be seen from FIG. 3, not all the sampling points of a set of sampling points for an application of the sampling mask 34 will necessarily be covered by a primitive.

In the present embodiment, as shown in FIG. 7, each fragment that is generated by the rasteriser is associated with an 8 bit coverage mask 73. The coverage mask 73 associated with each fragment 70 contains 8 bits to allow for the set of eight sampling points that will be associated with the fragment when carrying out 8×MSAA (as will be discussed further below).

When carrying out 4×MSAA, each fragment 70 still has an 8 bit coverage mask 73 associated with it, but because when carrying out 4×MSAA each fragment 70 will only have a set of four sampling points associated with it, the upper 4 bits 74 of the coverage mask 73 for a fragment are automatically cleared (set to "0") when carrying out 4×MSAA. Thus, when carrying out 4×MSAA, only the lower 4 bits 75 of the coverage mask 73 are used to represent the sampling points of the set of sampling points that are associated with the fragment.

(It should be noted here that although when carrying out 4×MSAA each fragment still has an 8 bit coverage mask associated with it, because when carrying out 4×MSAA the upper 4 bits 74 of the coverage mask 73 are set to "0", the "early-out" mechanism discussed below for avoiding processing sub-fragments for which none of the sampling points is covered by the primitive means that when doing 4×MSAA each fragment will only be processed once (undergo one processing pass), for the relevant "active" lower half 75 of the coverage mask 73 at each stage of the graphics processing pipeline. (In other words, setting the upper 4 bits 74 of the coverage mask 73 to "0" ensures that that part of the coverage mask will automatically be omitted from being processed (the processing of that part of the coverage mask will automatically be skipped) by the relevant stage of the graphics processing pipeline when performing 4×MSAA.))

Thus, when carrying out 4×MSAA, when the rasteriser 3 receives a primitive for rendering, it will firstly determine which sets of four sampling points (sampling masks) of the sampling point array corresponding to respective pixels of the output include sampling points that are covered by the primitive, and for each of those sets of four sampling points, generate a fragment having associated with it data of the form shown in FIG. 7.

It will also set the upper 4 bits 74 of the coverage mask 73 for the fragment to "0", and set the lower 4 bits 75 of the coverage mask 73 to "1" or "0", depending upon how many of the set of four sampling positions associated with the fragment are covered by the primitive in question.

For example, if the primitive only covers two of the four sample positions associated with the fragment, the rasteriser 3 will generate a coverage mask 73, e.g., of the form shown in FIG. 7, in which the upper 4 bits 74 of the coverage mask 73 are set to "0", and the lower 4 bits 75 of the coverage mask 73 are set to indicate that two of the four sample positions are being rendered by the fragment 70, but that the other two sample positions are not being rendered by the fragment (since they are not covered by the primitive in question).

Each such fragment will then be output (passed onwards) to the rest of the graphics processing pipeline 1 for processing, as shown in FIG. 6.

(FIG. 6 for convenience shows schematically only the lower, "active" part 75 of the coverage mask for each fragment (when performing 4×MSAA), and does not show the unused upper part 74 of the coverage mask for each fragment and pixel.)

The fragments output by the rasteriser 3 are first subjected to early depth and stencil tests in the early depth and stencil testing stage 4. As the early depth and stencil testing stage 4 is configured, as discussed above, to be able to test four sample points per clock cycle, it can and does test all the ("active") sampling points associated with each 4×MSAA fragment that it receives in a single pass, and then outputs the so-tested fragments to the fragment shader 6.

The fragment shader 6 is configured, as discussed above, to process (shade) all the sampling points of each fragment that it receives for processing in parallel, as is the varying interpolator (varying position evaluator) 12 (where that is needed).

The shaded fragments are then subjected to a late depth and stencil test by the late depth and stencil test stage 7. As for the early depth and stencil test stage 4, because the late depth and stencil test stage 7 is configured to be able to test four sample points per clock cycle, the late depth and stencil test stage 7 tests all the (active) sampling points associated with each fragment that it receives in a single pass, and then outputs the so-tested fragments to the blender 9.

The blender 9 then blends the fragments it receives appropriately with corresponding fragment data already stored in the tile buffer 10. As the blender 9 is configured to be able to blend four samples per clock cycle, it can again blend all four "active" sampling points associated with a fragment that it receives in a single clock cycle, and so thus blends each fragment that it receives in a single processing pass.

Once the fragments have been blended, their data is stored appropriately in the tile buffers 10. The data for each rendered fragment is stored in the appropriate sample position(s) in the tile buffer array 10 as indicated by the coverage mask 73 associated with each fragment, so as to provide a separate set of fragment data for each individual covered sample position associated with the fragment. Thus, in the case of the fragment 70 exemplified in FIG. 7, for example, the rendered data for that fragment will be stored in two of the (active) sample positions in the tile buffers 10, but not in the other two (active) sample positions, that are associated with the fragment 70.

The fragment data that is stored in the tile buffers 10 comprises the colour (RGB), transparency (A), depth (Z) and stencil values for each sample position, as discussed above. This data can be stored in any suitable form.

As the tile buffers 10 each contain 32×32 data positions, the tile buffers 10 can store four sampling point values for each pixel of a 16×16 pixel tile, i.e. the tile buffers 10 natively support 4×MSAA for 16×16 pixel tiles.

Once this process has been completed for all the fragments relating to a given primitive, it is then be repeated for subsequent primitives of the output, e.g. image (since, as discussed above, the image will typically be made up of plural primitives, and not just a single primitive). The process is repeated for all the primitives within the tile in question, until the tile buffers 10 have the appropriate data stored in each of their sample positions.

The data stored in the tile buffers 10 is then be exported to the downsampling unit 11 for downsampling and subsequent exporting to the, e.g. frame buffer 13 for display, as is known in the art.

As discussed above, the downsampling unit 11 can provide 4× downsampling, i.e. such that four data entries stored in the tile buffers 10 will be downsampled to a single output data value (pixel) 14 per clock cycle. Thus, when performing 4×MSAA, the downsampling unit 11 will take four sample values, corresponding to the four samples that are taken for each pixel of the output image (as shown in FIG. 3) (since a 4× sampling mask is being used) and downsample them to a single pixel output value 14 for output to the frame buffer 13 in a single pass (clock cycle).

Once a given tile of the output (e.g. frame) has been processed in this manner, the next tile can then be processed in the same way, and so on, until all the tiles making up the desired output (e.g. frame for display) have been processed and output to the, e.g., frame buffer. The next output, e.g., frame for display, can then be generated in the same manner, and so on.

The above describes the operation of the present embodiment when using 4×MSAA to process a frame (e.g.) to be displayed. However, as discussed above, in the present embodiment it is also possible to use 8×MSAA to process a frame (e.g.) to be displayed. The operation of the present embodiment when using 8×MSAA will now be described with reference to FIG. 8.

When using 8×MSAA for sampling the frame in the present embodiment, the operation of the graphics processor is essentially the same as described above for the situation where a 4×MSAA is being used. Thus, a sampling mask is applied to the input image, samples are taken, fragments are generated and rendered to generate rendered fragment data for each covered sampling position, and the rendered samples are downsampled appropriately to provide output pixels for display.

Thus, unless otherwise indicated, the operation of the graphics processing pipeline 1 when performing 8×MSAA is the same as the operation when performing 4×MSAA. The following description will therefore focus on the differences between the two modes of operation.

As shown in FIG. 8, the process again starts with the rasteriser 3 receiving primitives 2 for rasterising into fragments for rendering. When carrying out 8×MSAA, the rasteriser must and does generate output fragments having sets of eight sampling points associated with them (rather than having four sampling points associated with them as was the case for 4×MSAA), i.e. fragments representing all the sampling points of a given output pixel (of a given 8× sampling mask application to the input primitive).

Figure 8:
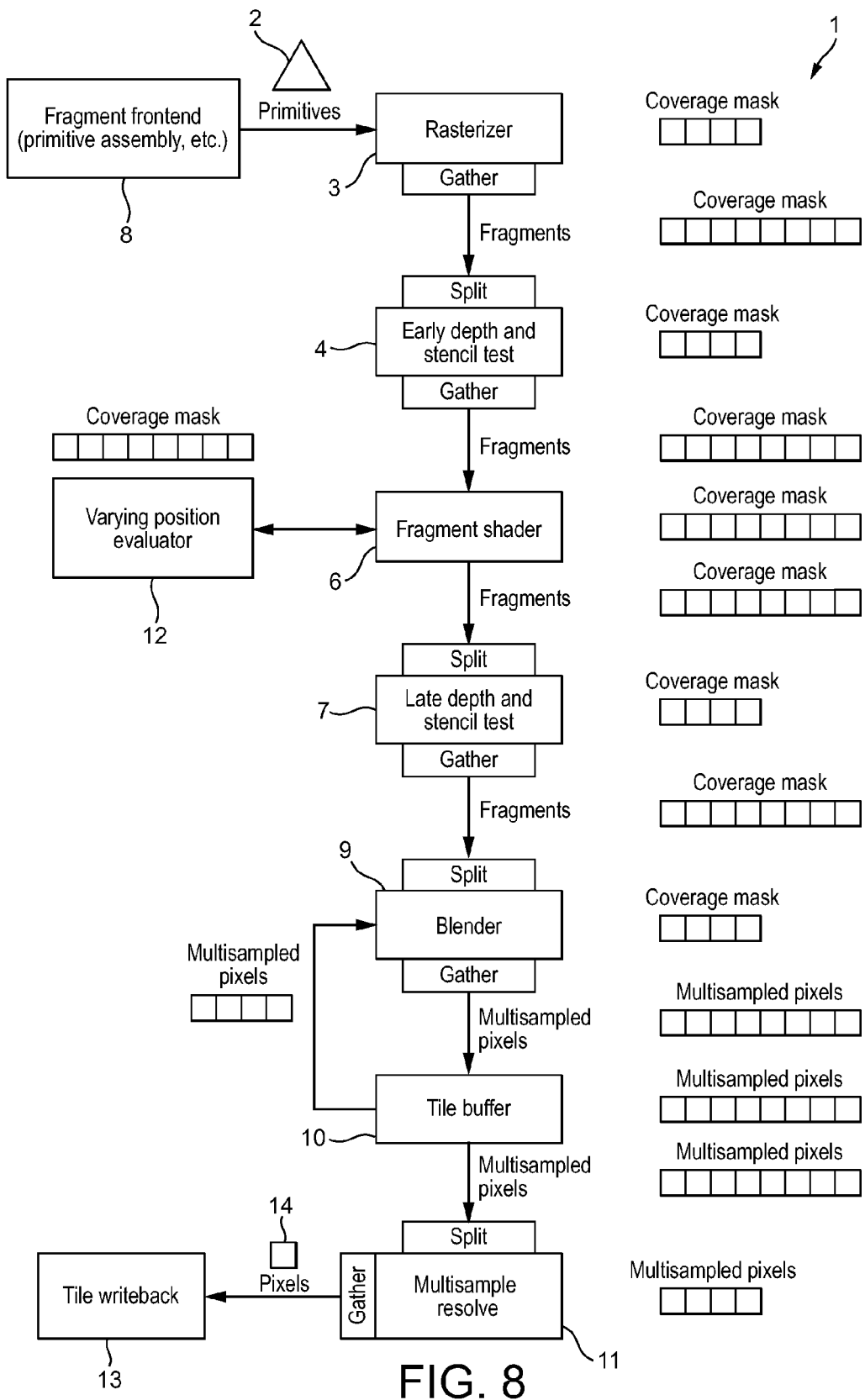
FIG. 8 shows schematically the operation of the graphics processing pipeline of FIG. 5 when performing 8×MSAA.

However, rather than the rasteriser 3 being configured to test a 8× sampling mask directly, in the present embodiment in the rasteriser 3 is configured, when the graphics processing pipeline 1 is to perform 8×MSAA, to test two 4× "sub-masks", each representing respective halves of the overall 8× sampling mask, to thereby, in effect, generate two sub-fragments, each having respective halves of the 8× sampling mask associated with them, and to then, as shown in FIG. 8, combine (gather) the two so-generated sub-fragments to provide an output fragment having the full set of eight sampling points and a corresponding eight sampling point coverage mask associated with it (when carrying out 8×MSAA, all the sampling point positions in the 8-bit coverage mask 73 of a fragment are used and "active", and so a full 8-bit coverage mask is used for each fragment, as shown in FIG. 8.)

In other words, the rasteriser 3, when carrying out 8× multisampled anti-aliasing, passes each fragment through its "native" 4×MSAA sample tester twice, once to test each half of the 8× sampling mask separately, and then combines the results to generate an output 8×MSAA fragment having a set of eight sampling points associated with it (and a corresponding coverage mask 73).

To facilitate this operation, the rasteriser 3 is configured to support the necessary additional "half" 8× sampling patterns that it will use when doing this. The cost of this is a tiny amount of control logic, and the necessary additional entries in the sample location look-up table. Rasterisation performance is also halved as compared to when performing 4×MSAA.

The output fragments having sets of eight sampling points associated with them are again then subjected to an early depth and stencil test in the early depth and stencil tester 4. The operation of the early depth and stencil test 4 is modified as compared to when carrying out 4× MSAA to account for the fact that 8×MSAA is being performed. As shown in FIG. 8, rather than having the depth and stencil tester 4 test all eight sampling points associated with an 8× MSAA fragment in one clock cycle, the early depth and stencil test 4 is instead configured to split each 8× fragment that it receives into two separate 4× "sub-fragments", each representing respective halves of the 8× fragment, and then to recombine the so-tested sub-fragments, to again provide an output 8× fragment having a full 8× coverage mask associated with it.

In other words, the early depth and stencil test 4 is, like the rasteriser 3, configured to process the 8× fragments in plural parts, so that it can operate at its "native" testing speed, with the respective parts then being recombined to provide the desired output 8× fragment. The cost for this operation is a small amount of control code, and a halving of the early depth and stencil testing maximum throughput rate as compared to when performing 4×MSAA.

The early depth and stencil test 4 is also configured to have an "early-out" mechanism to allow it to skip depth and stencil testing of a sub-fragment for which in fact none of the sampling points are actually covered by the primitive in question. (As discussed above, this mechanism is used when performing 4×MSAA to skip (avoid) testing the unused upper half 74 of the 8-bit coverage mask associated with the 4×MSAA fragments.)

The 8× fragments output from the early depth and stencil tester 4 are then input to the fragment shader 6. As shown in FIG. 8, the fragment shader 6 is configured to process each 8× fragment it receives as a whole. This is necessary to ensure that "true" 8×MSAA is performed.

The varying position evaluated (varying interpolator) 12 is similarly configured to process the 8× fragments as a whole (where required). This is necessary to ensure that the correct sampling point for centroid mapping required for 8×MSAA, for example, is selected when processing the 8× fragment. The cost of this is an additional 4 bits in the bit scanner and an additional eight entries in the constant sample look-up table for the varying interpolator 12.

The fragment shaded 8× fragments that are output from the fragment shader 6 are then subjected to a late depth and stencil test in the late depth and stencil tester 7. As for the early depth and stencil tester 4, the late depth and stencil tester 7 is configured to process the 8× fragments it receives in two parts, as respective "sub-fragments" each corresponding to a respective four sampling points of the eight sampling points associated with the fragment. Similarly, the late depth and stencil tester 7 has an "early-out" mechanism to allow it to skip depth and stencil testing of a sub-fragment for which in fact none of the sampling points are actually covered by the primitive in question.

The recombined 8× fragments that exit the late depth and stencil tester 7 are then blended (if required) in the blender 9. Like the early and late depth and stencil testers, the blender 9 is configured to process each 8× fragment in plural parts, each corresponding to a sub-fragment representing four sampling points of the set of eight sampling points that the fragment is associated with. This again is so as to allow the blender 9 to operate its blending processes at the 4× rate that it is configured to support, without the need to also configure it to "natively" support 8× blending. Again, the blender 9 has an "early-out" mechanism to allow it to skip depth and stencil testing of a sub-fragment for which in fact none of the sampling points are actually covered by the primitive in question.

The 8× fragments output from the blender 9 are then stored in the tile buffers 10. However, when performing 8×MSAA, there will be twice as many sampling points per tile as there would be for 4×MSAA. To account for this without the need to increase the size of the tile buffers, the graphics processing pipeline 1 is configured to, when performing 8×MSAA, render each tile twice, once to render the upper half of the tile and then to render the lower half of the tile.

Figure 9:
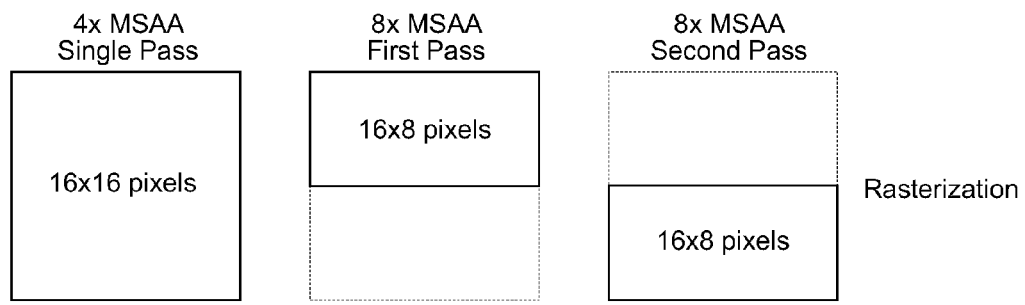
FIGS. 9 and 10 illustrate aspects of the operation of the graphics processing pipeline of FIG. 5 when performing 8×MSAA.

This is illustrated in FIG. 9, which shows the two rasterisation passes for 8×MSAA, a first pass rasterising the 16×8 pixels of the upper half of the 16×16 pixel tile, and the second pass rendering 16×8 pixels of the lower half of the 16×16 tile. FIG. 9 also shows in comparison the single rasterisation pass rasterising all 16×16 pixels of the tile that will be done when performing 4×MSAA.

As only half the tile is being processed at any one time, there is then enough space in the tile buffers for all the samples for that tile half (at 8×MSAA). As the rasteriser 3 operates hierarchically (as discussed above), the omission of the half of the tile that is not to be processed in a given rendering pass can be done very efficiently. The cost for this is a tiny amount of control logic, and the requirement to carry out two rendering passes for each tile to be processed (i.e. to run through all the primitives in a tile twice).

Figure 10:
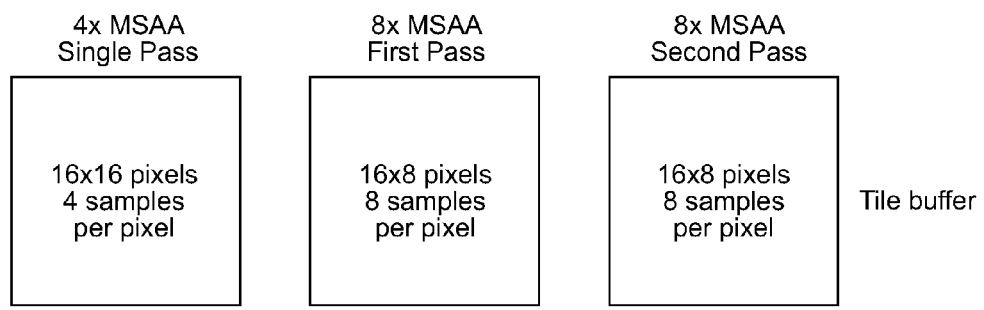

FIG. 10 correspondingly shows the content of the tile buffers 10 for each processing pass. Thus, as shown in FIG. 10, when performing 8×MSAA, a first pass will fill the tile buffers with eight samples per pixel for the 16×8 pixels of the upper half of the tile, and the second rendering pass will fill the tile buffer with eight samples per pixel for the 16×8 pixels of the lower half of the tile. (In contrast, as shown in FIG. 10, when carrying out 4×MSAA, there is a single pass which fills the tile buffers with four samples per pixel for each of the 16×16 pixels of the tile.)

Once the relevant half of the tile has been processed and the tile buffers 10 filled with the relevant tile sample data, then again the tile data is downsampled and written back to the frame buffer.

As shown in FIG. 8, the downsampling (multisample resolve) unit 11 is configured to process each 8× pixel in plural parts, each representing a respective set of four sampling points of the eight sampling points that need to be downsampled for the pixel in question. This again allows the downsampler 11 to operate at its "native" downsampling rate, i.e. performing 4× downsampling.

As will be appreciated by those skilled in the art, each 4× downsampling operation will produce an output value. These two output values (one from each part of the 8× pixel) will then need to be combined together to give the final single pixel value that is output (written back) to the, e.g., frame buffer.

In the present embodiment, the downsampling unit 11 includes separate circuitry for performing 2× supersampled anti-aliasing (2×SSAA), and so this circuitry is used to combine the two downsampled result values from each 4× downsample operation (pass) on the respective halves of the set of eight sampling points for a given output pixel without the need for an additional clock cycle to give a single output value for the 8× pixel (which is then written back to the frame buffer).

Thus the downsampling and tile writeback operation when performing 8×MSAA is essentially configured to operate as it would for 4×MSAA+2×SSAA (the only difference being that it also needs to take account of which half of the tile is being written back). The area overhead for this is negligible.

Where the downsampling unit 11 does not natively support (e.g. include separate circuitry for) 2×SSAA, then the two downsampled result values from each 4× downsample operation on the respective halves of the set of the eight sampling points for a given output pixel could instead be, e.g., appropriately combined (averaged) to give a single output value for the 8× pixel in a subsequent downsampling pass (in the next clock cycle), if desired.

Other arrangements to allow the rendered fragment data to be stored at the same pixel resolution in the tile buffers when performing 8×MSAA (i.e. such that each tile buffer still corresponds to a 16×16 array of output pixels, even though there will be 8 samples per output pixel, rather than four samples per output pixel), such as compressing the rendered fragment data for each sampling position when 8×MSAA is being used could be used, if desired.

The above describes how the present embodiment may be used to carry out 4× multisampling or 8× multisampling of an output to be generated by the graphics processing pipeline, such as a frame to be displayed. The application sending the data to the graphics processor for processing may indicate which form of multisampling (4× or 8×) is to be used, and the graphics processor will then configure itself and operate accordingly.

Although the present embodiments are described above with respect to carrying out 8×MSAA using a graphics processing pipeline that has processing stages configured to natively support 4×MSAA, the same principles can be applied to any number of samples and any higher level of multisampled anti-aliasing, such as 16×MSAA or higher. Equally, the graphics processing pipeline could be configured to natively support some other level of multisampled anti-aliasing, with the same principles then being applied to a respective higher level or levels of multisampled anti-aliasing.

It can be seen from the above that the technology described herein, in its embodiments at least, provides a way to implement higher levels of multisampled anti-aliasing using a graphics processing pipeline that is configured to natively support a lower level of anti-aliasing and without having to incur significant additional hardware costs.

Thus, for example, the technology described herein, in its embodiments at least, allows 8× multisampling (anti-aliasing) to be achieved using, in essence, architecture that is configured to perform 4× multisampling (anti-aliasing). The user accordingly has the choice of selecting between 4× multisampling and 8× multisampling, albeit with a performance drop, but in any event at a much lower cost than having to configure the architecture to support "full speed" 8× multisampled anti-aliasing.

The technology described herein can accordingly allow a higher rate of anti-aliasing to be achieved, but without the need for a significant increase in size and power usage of the graphics processor.

This is achieved, in the embodiments of the technology described herein at least, by, when performing the higher level of multisampled anti-aliasing, running over selected parts of the graphics processing pipeline plural times, and then combining the results. Other selected parts of the processing pipeline are configured to process fragments as a whole when carrying out the higher level of multisampled anti-aliasing, so as to ensure compliance with the desired higher level of multisampled anti-aliasing.

The foregoing detailed description has been presented for purposes of illustration and description. It is not intended to be exhaustive or to limit the technology described herein to the precise form disclosed. Many modifications and variations are possible in light of the above teaching. The described embodiments were chosen in order to best explain the principles of the technology described herein and its practical application to thereby enable others skilled in the art to best utilize the technology described herein in various embodiments and with various modifications as are suited to the particular use contemplated. It is intended that the scope of the technology described herein be defined by the claims appended hereto.

What is claimed is:

1. A method of carrying out a higher level of multisampled anti-aliasing in a graphics processing pipeline having a plurality of processing stages, at least some of which are configured to natively support a lower level of multisampled anti-aliasing, the method comprising:
   when performing the higher level of multisampled anti-aliasing:
      the rasteriser of the graphics processing pipeline generating graphics fragments each representing a set of sampling points for the higher level of anti-aliasing, and passing those fragments representing the set of sampling points for the higher level of anti-aliasing to one or more later processing stages of the graphics processing pipeline that perform per-fragment processing operations and to one or more later processing stages of the graphics processing pipeline that perform per-sample processing operations for processing;
      the one or more later processing stages of the graphics processing pipeline that perform per-fragment processing operations processing each graphics fragment that they receive for processing in a processing pass that processes all the sampling points that the fragment represents in parallel; and
      the one or more later processing stages of the graphics processing pipeline that perform per-sample processing operations processing each graphics fragment that they receive for processing in one or more processing passes, each such processing pass processing a sub-set of some but not all of the sampling points of the set of sampling points that the fragment represents;
   and the method further comprising:
   when performing the lower level of multisampled anti-aliasing:
      the rasteriser of the graphics processing pipeline generating graphics fragments each representing a set of sampling points for the lower level of anti-aliasing, and passing those fragments representing the set of sampling points for the lower level of anti-aliasing to one or more later processing stages of the graphics processing pipeline that perform per-fragment processing operations and to one or more later processing stages of the graphics processing pipeline that perform per-sample processing operations for processing;
      the one or more later processing stages of the graphics processing pipeline that perform per-fragment processing operations processing each graphics fragment that they receive for processing in a processing pass that processes all the sampling points that the fragment represents in parallel; and
      the one or more later processing stages of the graphics processing pipeline that perform per-sample processing operations processing each graphics fragment that they receive for processing in a processing pass that processes all the sampling points that the fragment represents in parallel.

2. The method of claim 1, comprising:
   associating each graphics fragment with a coverage mask indicating which of the sampling points in the set of sampling points that the fragment corresponds to are covered by the primitive being sampled; and wherein:
   each fragment generated by the rasteriser is associated with a sampling point coverage mask corresponding to the highest level of anti-aliasing that can be performed; and the method further comprises:
   clearing the appropriate bits in the coverage mask when performing a lower level of anti aliasing.

3. The method of claim 1, wherein the rasteriser, when performing the higher level of anti-aliasing, performs plural rasterisation passes for each fragment to be generated, each pass testing a sub-set of the set of sampling positions to be generated for the fragment, and then combines the results of these rasterisation passes to generate the fragment that is passed on to the later stages of the graphics processing pipeline.

4. The method of claim 1, wherein the later processing stages of the graphics processing pipeline that process each graphics fragment that they receive for processing in a processing pass that processes all the sampling points that the fragment represents in parallel when carrying out the higher level anti-aliasing, comprise at least one of: a fragment shader, and a varying interpolator of the graphics processing pipeline.

5. The method of claim 1, wherein the later graphics processing stages that subject each fragment to one or more processing passes, each pass processing a sub-set of the sampling points that the fragment represents, when performing higher level anti-aliasing, comprise at least one of: a blender, and a depth tester of the graphics processing pipeline.

6. The method of claim 1, wherein at least one of the graphics processing stages configured to process each fragment in one or more passes, each pass processing a sub-set of the sampling positions associated with the fragment, when performing higher level anti-aliasing, is configured to be able to omit and/or abort a processing pass for a sub-set of the sampling positions for a fragment for which none of the sampling positions is actually covered.

7. The method of claim 1, comprising at least one of the graphics processing stages that are configured, when performing higher level anti-aliasing, to process each fragment in one or more passes, each pass processing a sub-set of the sampling positions associated with the fragment, when performing higher level anti-aliasing splitting input fragments that they receive for processing from a preceding stage of the graphics processing pipeline into plural sub-fragments, each representing a different sub-set of the sampling points associated with the input fragment, then processing the sub-fragments independently of each other, and then recombining the processed sub-fragments into output fragments for passing to a next stage of the graphics processing pipeline.

8. The method of claim 1, wherein the graphics processing pipeline is a tile-based rendering pipeline, and the method comprises, when performing a higher level of anti-aliasing, processing each tile to be rendered as a plurality of sub-tiles, each representing a part of a tile to be rendered, so as to allow higher level anti-aliasing to be performed without the need to increase the size of the tile buffers.

9. The method of claim 1, wherein:
the graphics processing pipeline includes a down-sampling stage to resolve the rendered sample values to output pixel values to be written out to main memory; and the method further comprises:
when performing higher level anti-aliasing, performing the down-sampling operation multiple times for a given output pixel value to be generated, for different parts of the pixel, and then combining the results to give the overall output pixel value to be written back to the main memory.

10. A graphics processing pipeline comprising:
a rasteriser that generates graphics fragments each representing a set of sampling points for a given level of anti-aliasing,
one or more later processing stages that perform per-fragment processing operations; and
one or more later processing stages that perform per-sample processing operations and that are configured to natively support a lower level of multisampled anti-aliasing; wherein:
the rasteriser is configured to pass graphics fragments that the rasteriser generates to the one or more later processing stages of the graphics processing pipeline that perform per-fragment processing operations and to the one or more later processing stages of the graphics processing pipeline that perform per-sample processing operations for processing;
the one or more later processing stages of the graphics processing pipeline that perform per-fragment processing operations are configured to:
when processing graphics fragments representing sets of sampling points for a higher level of anti-aliasing that is higher than the lower level of anti-aliasing that the one or more later processing stages that perform per-sample processing operations are configured to natively support, process each graphics fragment representing a set of sampling points for the higher level of anti-aliasing that they receive for processing in a processing pass that processes all the sampling points that the fragment represents in parallel; and
when processing graphics fragments representing a set of sampling points for the lower level of anti-aliasing that the one or more later processing stages that perform per-sample processing operations are configured to natively support, process each graphics fragment representing a set of sampling points for the lower level of anti-aliasing that they receive for processing in a processing pass that processes all the sampling points that the fragment represents in parallel; and
the one or more later processing stages of the graphics processing pipeline that perform per-sample processing operations are configured to:
when processing graphics fragments representing a set of sampling points for a higher level of anti-aliasing that is higher than the lower level of anti-aliasing that the one or more later processing stages that perform per-sample processing operations are configured to natively support, process each graphics fragment representing a set of sampling points for the higher level of anti-aliasing that they receive for processing in one or more processing passes, each such processing pass processing a sub-set of some but not all of the sampling points of the set of sampling points that the fragment represents; and
when processing graphics fragments representing a set of sampling points for the lower level of anti-aliasing that the one or more later processing stages that perform per-sample processing operations are configured to natively support, process each graphics fragment representing a set of sampling points for the lower level of multisampled anti-aliasing that they receive for processing in a processing pass that processes all the sampling points that the fragment represents in parallel.

11. A graphics processing pipeline comprising:
a rasteriser that generates graphics fragments each representing a set of sampling points to be processed;
one or more later processing stages that perform per-fragment processing operations; and
one or more later processing stages that perform per-sample processing operations; wherein:
the rasteriser is configured to pass graphics fragments that the rasteriser generates to the one or more later processing stages of the graphics processing pipeline that perform per-fragment processing operations and to the one or more later processing stages of the graphics processing pipeline that perform per-sample processing operations for processing;

the one or more later processing stages of the graphics processing pipeline that perform per-fragment processing operations are configured to, when performing a lower level of multisampled anti-aliasing, process each graphics fragment that they receive for processing in a processing pass that processes all the sampling points that the fragment represents in parallel, and when performing a higher level of anti-aliasing process each graphics fragment that they receive for processing in a processing pass that processes all the sampling points that the fragment represents in parallel; and the one or more later processing stages of the graphics processing pipeline that perform per-sample processing operations are configured to when performing the lower level of multisampled anti-aliasing process each graphics fragment that they receive for processing in a processing pass that processes all the sampling points that the fragment represents in parallel, but when performing the higher level of anti-aliasing process each graphics fragment that they receive for processing in one or more processing passes, each such processing pass processing a sub-set of some but not all of the sampling points of the set of sampling points that the fragment represents.

12. The graphics processing pipeline of claim 11, wherein the rasteriser is configured to associate each fragment generated by the rasteriser with a sampling point coverage mask indicating which of the sampling points in the set of sampling points that the fragment corresponds to are covered by the primitive being sampled corresponding to the highest level of anti-aliasing that can be performed, and to clear the appropriate bits in the coverage mask when performing a lower level of anti-aliasing.

13. The graphics processing pipeline of claim 11, wherein the rasteriser is configured to, when performing the higher level of anti-aliasing, perform plural rasterisation passes for each fragment to be generated, each pass testing a sub-set of the set of sampling positions to be generated for the fragment, and to then combine the results of these rasterisation passes to generate the fragment that is passed on to the later stages of the graphics processing pipeline.

14. The graphics processing pipeline of claim 11, wherein the later processing stages of the graphics processing pipeline that process each graphics fragment that they receive for processing in a processing pass that processes all the sampling points that the fragment represents in parallel when carrying out the higher level anti-aliasing, comprise at least one of: a fragment shader, and a varying interpolator of the graphics processing pipeline.

15. The graphics processing pipeline of claim 11, wherein the later graphics processing stages that subject each fragment to one or more processing passes, each pass processing a sub-set of the sampling points that the fragment represents, when performing higher level anti-aliasing, comprise at least one of: a blender, and a depth tester of the graphics processing pipeline.

16. The graphics processing pipeline of claim 11, wherein one or more of the graphics processing stages configured to process each fragment in one or more passes, each pass processing a sub-set of the sampling positions associated with the fragment, when performing higher level anti-aliasing, are configured to be able to omit and/or to abort a processing pass for a sub-set of the sampling positions for a fragment for which none of the sampling positions is actually covered.

17. The graphics processing pipeline of claim 11, wherein one or more of the graphics processing stages configured to process each fragment in one or more passes, each pass processing a sub-set of the sampling positions associated with the fragment, when performing higher level anti-aliasing, are configured to split input fragments that they receive for processing from a preceding stage of the graphics processing pipeline into plural sub-fragments, each representing a different sub-set of the sampling points associated with the input fragment, to then process the sub-fragments independently of each other, and to then recombine the processed sub-fragments into output fragments for passing to a next stage of the graphics processing pipeline.

18. The graphics processing pipeline of claim 11, wherein the graphics processing pipeline is a tile-based rendering pipeline, and the graphics processing pipeline is configured to, when performing a higher level of anti-aliasing, process each tile to be rendered as a plurality of sub-tiles, each representing a part of a tile to be rendered, so as to allow higher level anti-aliasing to be performed without the need to increase the size of the tile buffers.

19. The graphics processing pipeline of claim 11, wherein:

the graphics processing pipeline includes a down-sampling stage to resolve the rendered sample values to output pixel values to be written out to a main memory; and the down-sampling stage is configured to, when performing higher level anti-aliasing, perform the down-sampling operation multiple times for a given output pixel value to be generated, for different parts of the pixel, and to then combine the results to give the overall output pixel value to be written back to the main memory.

20. A non-transitory computer readable storage medium storing computer software code which when executing on a processor performs a method of carrying out a higher level of multisampled anti-aliasing in a graphics processing pipeline having a plurality of processing stages, at least some of which are configured to natively support a lower level of multisampled anti-aliasing, the method comprising:

when performing the higher level of multisampled anti-aliasing:

the rasteriser of the graphics processing pipeline generating graphics fragments each representing a set of sampling points for the higher level of anti-aliasing, and passing those fragments representing the set of sampling points for the higher level of anti-aliasing to one or more later processing stages of the graphics processing pipeline that perform per-fragment processing operations and to one or more later processing stages of the graphics processing pipeline that perform per-sample processing operations for processing;

the one or more later processing stages of the graphics processing pipeline that perform per-fragment processing operations processing each graphics fragment that they receive for processing in a processing pass that processes all the sampling points that the fragment represents in parallel; and the one or more later processing stages of the graphics processing pipeline that perform per-sample processing operations processing each graphics fragment that they receive for processing in one or more processing passes, each such processing pass processing a sub-set of some but not all of the sampling points of the set of sampling points that the fragment represents;

and the method further comprising:

when performing the lower level of multisampled anti-aliasing:

the rasteriser of the graphics processing pipeline generating graphics fragments each representing a set of sampling points for the lower level of anti-aliasing, and passing those fragments representing the set of sampling points for the lower level of anti-aliasing to one or more later processing stages of the graphics processing pipeline that perform per-fragment processing operations and to one or more later processing stages of the graphics processing pipeline that perform per-sample processing operations for processing;

the one or more later processing stages of the graphics processing pipeline that perform per-fragment processing operations processing each graphics fragment that they receive for processing in a processing pass that processes all the sampling points that the fragment represents in parallel; and the one or more later processing stages of the graphics processing pipeline that perform per-sample processing operations processing each graphics fragment that they receive for processing in a processing pass that processes all the sampling points that the fragment represents in parallel.

\* \* \* \* \*